United States Patent [19]

Capitant et al.

[11] Patent Number: 5,255,083
[45] Date of Patent: Oct. 19, 1993

[54] DIGITAL COLOR CORRECTION SYSTEM AND METHOD

[75] Inventors: Patrice J. Capitant, Los Altos; Vinson R. Perry, San Carlos; David C. Collier, Gilroy; John Carlucci, Sunnyvale, all of Calif.

[73] Assignee: Sony Corporation of America, Park Ridge, N.J.

[21] Appl. No.: 710,704

[22] Filed: Jun. 5, 1991

[51] Int. Cl.⁵ .............................................. H04N 1/70
[52] U.S. Cl. .................................. 358/527; 358/448; 358/500
[58] Field of Search ...................... 358/76, 78, 75, 80, 358/81, 447, 448

[56] References Cited

U.S. PATENT DOCUMENTS

| | | |
|---|---|---|
| 4,096,523 | 6/1978 | Belmares-Sarabia et al. ......... 358/80 |
| 4,272,780 | 6/1981 | Belmares-Sarabia et al. ......... 358/54 |
| 4,410,908 | 10/1983 | Belmares-Sarabia et al. ......... 358/30 |
| 4,418,358 | 11/1983 | Poetsch et al. ......... 358/80 |
| 4,642,682 | 2/1987 | Orsburn et al. ......... 358/80 |
| 4,679,067 | 7/1987 | Belmares-Sarabia et al. ......... 358/29 |
| 4,694,329 | 9/1987 | Belmares-Sarabia et al. ......... 358/22 |
| 4,750,050 | 6/1988 | Belmares-Sarabia et al. ...... 358/311 |
| 4,763,186 | 8/1988 | Belmares-Sarabia et al. ......... 358/22 |
| 4,782,390 | 11/1988 | Hayashi et al. ......... 358/76 |
| 4,811,084 | 3/1989 | Belmares-Sarabia et al. ......... 358/22 |
| 4,823,184 | 4/1989 | Belmares-Sarabia et al. ......... 358/27 |
| 4,857,994 | 8/1989 | Belmares-Sarabia et al. ......... 358/22 |
| 4,862,251 | 8/1989 | Belmares-Sarabia et al. ......... 358/22 |
| 4,866,511 | 9/1989 | Belmares-Sarabia et al. ......... 358/27 |
| 4,907,071 | 3/1990 | Belmares-Sarabia et al. ......... 358/22 |

FOREIGN PATENT DOCUMENTS 0232542 11/1985 Japan ......................... 358/76

OTHER PUBLICATIONS

K. Staes, "Masking in the film-telecine system," the BKSTS Journal, Dec. 1977, pp. 354-360.
A. E. S. Green and R. D. McPeters, "New Analytic Expressions of Photographic Characteristic Curves," Applied Optics, vol. 14, No. 2, Feb. 1975, pp. 271-272.
L. J. D'Luna, K. A. Parulski, D. C. Maslyn, M. A. Hadley, T. J. Kenney, R. H. Hibbard, R. M. Guidash, P. P. Lee, and C. N. Anagnostopoulos, "A Digital Video Signal Post-Processor For Color Image Sensors," Proceedings of IEEE 1989 Custom Integrated Circuits Conference, pp. 24.2.1-24-2.4.

Primary Examiner—Edward L. Coles, Sr.
Assistant Examiner—Jerome Grant, II
Attorney, Agent, or Firm—Limbach & Limbach

[57] ABSTRACT

A digital color correction system and method provide for color correction in a film-to-video signal conversion system. Film color correction is done by correcting incoming digitized film color signals (e.g. red, green and blue) according to film color correction parameters which represent film characteristics, such as film speed, gamma, and minimum and maximum film dye density. The film color correction parameters are used to sensitometrically convert the film color signals to video color signals according to a sensitometric film model, such as the Hurter-Driffield ("HD") characteristic curve. Video color correction is then performed upon the corrected film color signals according to video color correction parameters which represent video signal characteristics, such as hue and saturation, as well as a video color standard model, such as SMPTE 240M. Alternatively, separate signals representing the film or video color correction parameters can be encoded as separate data into the corrected or uncorrected color signals. This color correction or color correction parameter encoding can be done on a field-by-field, frame-by-frame or scene-by-scene basis, so that each resulting video field, frame or scene, respectively, is appropriately color corrected or contains its own specific color correction information.

43 Claims, 11 Drawing Sheets $y = ax^3 + bx^2 + cx + d$

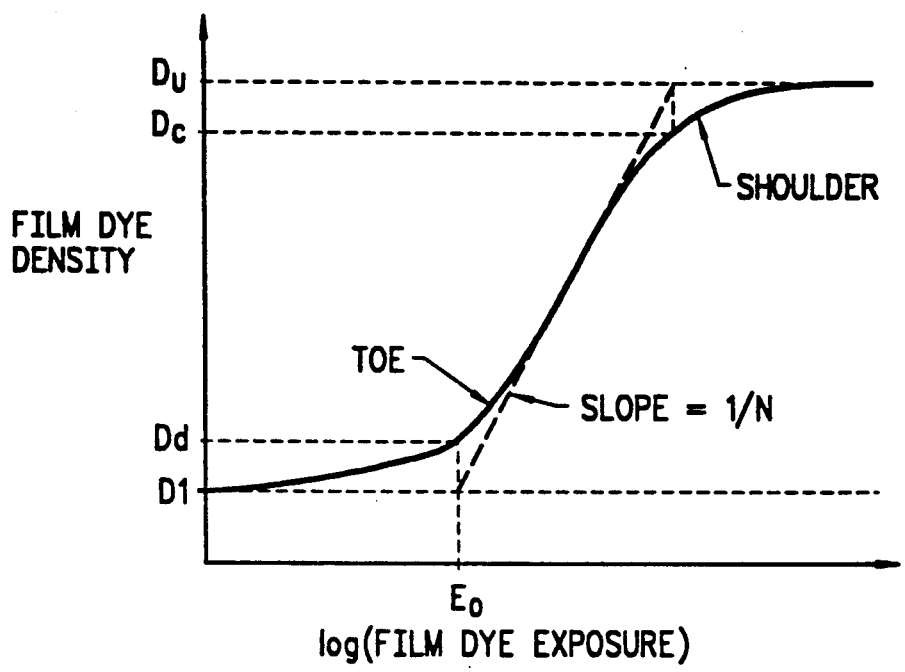
FIG. 5
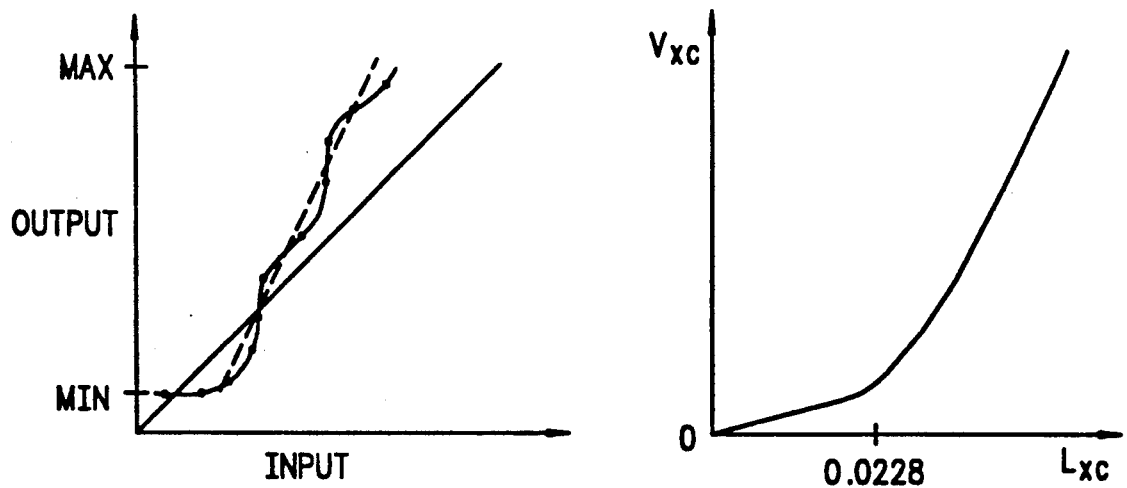
FIG. 8
FIG. 9

DIGITAL VIDEO STANDARD

DIGITAL COLOR CORRECTION SYSTEM AND METHOD

BACKGROUND OF THE INVENTION

Field of the Invention

The present invention relates to color correction systems for video signals, and in particular, to color correction systems for film-to-video conversion systems.

Description of the Related Art

Color correction systems for selectively correcting electronic signals representing optical images are well known in the art. Various forms of color correctors are used in many sophisticated video systems. In particular, sophisticated color correctors are used in film-to-video conversion systems, such as telecines. Particularly in the case of telecines, color correction is needed to overcome color inaccuracies or nonlinearities introduced due to the nature of film and by the electronic scanning of the optical film images to produce the corresponding video signals.

Color correctors in such systems have typically required levels of skill beyond the capabilities of many, if not most, operators or editors. Indeed, color correction is often viewed as more art than science. With the growing use of video systems and the corresponding growth in need for editors for such systems, color correctors which require less skill, while providing equivalent if not better color correction, are needed.

Two aspects of color correction in particular have up to now required a great deal of skill, experience and insight to effectively operate conventional color correctors and provide the desired color correction. The first aspect, and perhaps the more difficult, involves correcting for film characteristics. Such film characteristics include crosstalk between the dyes in the multiple emulsion layers of color film, film speed, gamma, and minimum and maximum film dye densities. Further, film characteristics are generally nonlinear in nature, and are therefore very difficult to compensate, or correct.

A second difficult aspect of color correction involves video signal characteristics. Such characteristics include hue (or tint), saturation and intensity (or value). While perhaps more straightforward to compensate, or correct, than the aforementioned film characteristics, they are nonetheless nontrivial. Further, a video signal typically must be converted in accordance with a color standard which is dependent upon the video display device (e.g. cathode ray tube) and the video signal standard (e.g. NTSC or PAL) being used.

A major difficulty facing editors, or "colorists," is that most color correction circuitry in conventional color correction systems is analog, and therefore not very precise or flexible. If adjustments are needed to accommodate one particular parameter being corrected, most if not all other parameters are typically also affected to varying degrees. Some newer, more sophisticated color correction systems, such as special effects machines, do use some digital designs. However, these machines are generally video only, i.e. only video signals are processed, and therefore only the simpler corrections for video signal characteristics are provided. In other words, the more difficult corrections for film characteristics are not available. Thus, the digital color correction systems for video signal characteristics can be of minimal value in a film-to-video conversion system.

An additional related shortcoming to conventional color correction systems involves the retention of any color correction signals or data generated. Some systems have provided for digital storage of color correction data. However, this storage of color correction data is remote from the video signal itself, and related thereto only by some form of video signal identification data, such as timing information or frame number. Conventional color correctors have not provided for somehow embedding the color correction data within the video signal itself. Instead, they simply color correct the signal, thereby losing both the original uncorrected signal information and the color correction information or data.

SUMMARY OF THE INVENTION

The present invention provides a digital color correction system and method for correcting a digital film color signal representing a portion of a colored optical film image in accordance with a plurality of color correction parameters. In a preferred embodiment, the color correction parameters represent a plurality of film characteristics, such as film speed, gamma, and minimum and maximum film dye densities. A digital film color signal (e.g. a red, green or blue digitized film image scanning signal) is received and color corrected (i.e. the received digital film color signal is modified) in accordance with the color correction parameters represented by digital film color correction signals. This color correction is done through a sensitometric conversion in accordance with a film model, i.e. a model based upon film characteristics.

In an alternative embodiment, video signal color correction is also provided. Digital video color correction signals are received which represent video signal characteristics, such as hue, saturation and value. The color corrected film color signal can then be further corrected (i.e. further modified) according to the video color correction signals. The resulting signal, selectively corrected according to both film and video signal characteristics, is then converted in accordance with a video color standard (e.g. SMPTE 240 M) for display.

In a further alternative embodiment, the digital film or video color correction signals representing film or video signal characteristics, respectively, is selectively encoded as separate data within the digital video signal itself. The desired color correction data is selectively encoded as data separate from the digital video information within the fully corrected, partially corrected, or uncorrected video signal (e.g. within the vertical interval) for subsequent retrieval and use. Thus, both the fully or partially corrected color signal, or alternatively the initial uncorrected color signal, as well as the color correction data, is available for separate use or combining, as desired.

The color correction (film and video) and color correction parameter encoding provided by the present invention can be selectively done on any basis. For example, color correction or encoding can be done on a frame-by-frame or scene-by-scene basis. Further, if desired, such color correction or encoding according to the present invention can be done on a field-by-field basis.

These and other objects, features and advantages of the present invention will be understood upon consider-

BRIEF DESCRIPTION OF THE DRAWINGS

FIG. 5 illustrates a graph of film dye density versus the logarithm of the film dye exposure, as defined according to a film characteristic model used in the color correction system and method of the present invention.

FIG. 8 illustrates an exemplary graph of a video color correction capability afforded by the present invention.

FIG. 9 illustrates a graph for conversion of the color corrected video signal according to the SMPTE 240 M video color standard.

DETAILED DESCRIPTION OF THE INVENTION

The present invention can be embodied within the apparatus disclosed in a commonly assigned, copending Pat. application having Ser. No. 07/741,329, entitled "Non-Real-Time Film Scanning System" and filed by Capitant et al. on . Aug. 7, 1991. Further, the present invention can be used in conjunction with the apparatuses and methods disclosed in the commonly assigned, copending Pat. applications: Ser. No. 07/677,578, entitled "Film Scanning Apparatus and Method" and filed by Galt et al. on Mar. 29, 1991; Ser. No. 07/687,962, entitled "Digital Video Processing System With Gross And Fine Color Correction Modes" and filed by Capitant et al. on Apr. 19, 1991. The specifications of the foregoing patent applications are incorporated herein by reference.

Figure 1A:
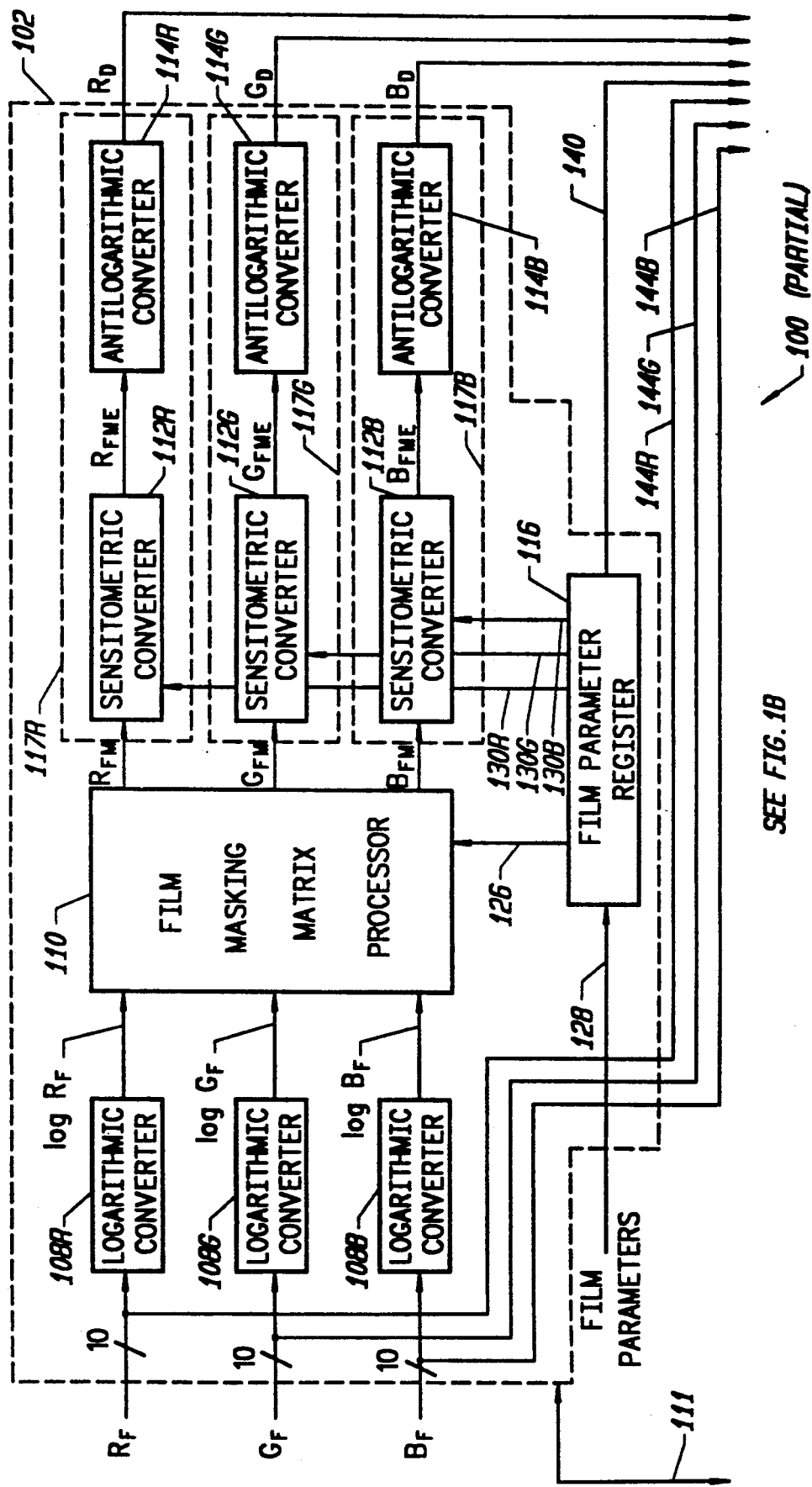
FIGS. 1A & 1B illustrates a block diagram of a color correction system in accordance with the present invention.
Figure 1B:
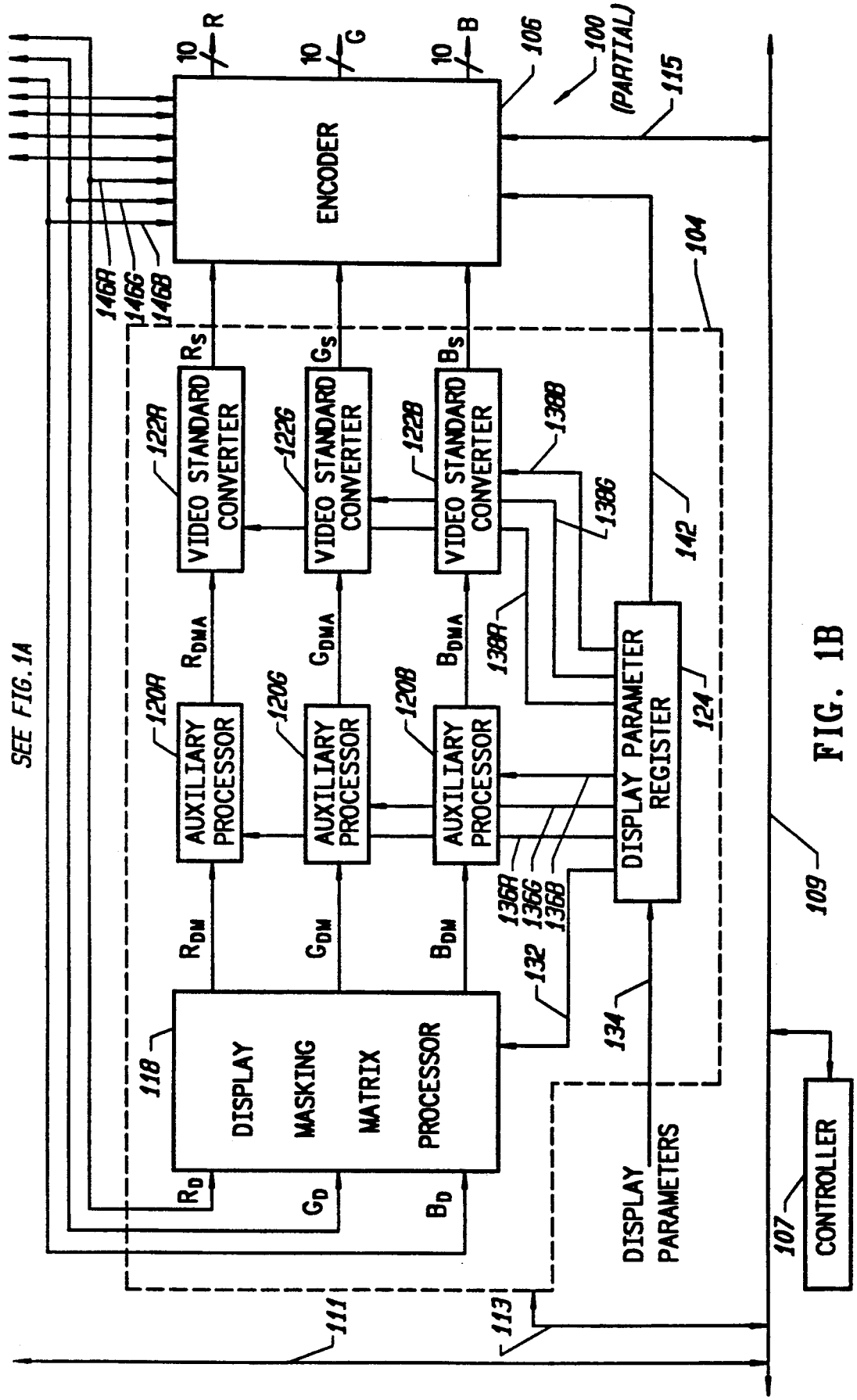

Referring to FIGS. 1A and 1B, a preferred embodiment of a digital color correction system in accordance with the present invention consists of three basic functional subsystems: a film parameter corrector 102; a video parameter corrector 104; an encoder 106; and a controller 107. The input signals $R_F$, $G_F$, $B_F$ and output signals R, G, B, as well as the signals in between them, are digital. In a present preferred embodiment, each input $R_F$, $G_F$, $B_F$ and output R, G, B signal has ten bits of information. Also, as seen in the drawings, various quantities of signal bits are used throughout the system (e.g. 12, 16, 18 or 24), depending upon the particular function being performed.

However, it should be understood that such signal bit quantities are merely exemplary and that, in accordance with the present invention, fewer or greater numbers of signal bits can be used, depending upon the desired resolution or accuracy. It should be further understood that as technology economically allows, a greater number of bits, e.g. 12, may be more desirable. Indeed, it has been suggested that color channels with at least 12 bits should be sufficient to ensure virtually error-free color reproduction, i.e. no visually perceptible quantization errors or anomalies (B. J. Lindbloom, "Accurate Color Reproduction for Computer Graphics Applications," Computer Graphics, Vol. 23, No. 3, Jul. 1989).

Each of the functions performed within each subsystem 102, 104, 106, as described more fully below, is performed in a digital and synchronous manner. In other words, each signal is processed digitally and synchronously. A controller 107, via a control bus 109 and control interfaces 111, 113, 115, coordinates and synchronizes the operations of the film parameter corrector 102, video parameter corrector 104 and encoder 106.

Throughout FIGS. 1A and 1B and the following discussion, several corresponding functional elements are referred to with like numerical designators having "R," "G" or "B" suffixes. The use of these suffixes is intended to indicate that those corresponding elements perform similar functions for their respective film or video color signals (e.g. red, green and blue).

Further, the following discussion refers to the color signals as corresponding to red, green and blue. However, it should be understood that other complementary color combinations can be used, as desired. For example, the color trio of cyan, magenta and yellow can be used with equal effectiveness. Indeed, providing for the selective use of alternative color trios (e.g. red, green and blue, or alternatively, cyan, magenta and yellow) is within the scope of the present invention and can be quite desirable to allow for the processing of either positive or negative film images.

Alternatively, a luminance-chrominance signal trio, comprising a luminance signal ("Y"), a red chrominance signal ("$P_R$") and a blue chrominance signal ("$P_B$"), can be used in accordance with the present invention. The luminance signal Y represents monochromatic brightness; the red chrominance signal $P_R$ represents the difference between the red and luminance signals ("R-Y"); and the blue chrominance signal $P_B$ represents the difference between the blue and luminance signals ("B-Y").

It should be further understood that the signal and interface lines discussed below can be provided and operated in either serial or parallel protocols, as desired. However, for maximum processing speeds, most if not all signals should preferably have their respective bits transferred or processed in parallel.

As discussed in more detail below, the film parameter corrector 102 comprises separate logarithmic converters 108R, 108G, 108B, a film masking matrix processor 110, separate sensitometric and antilogarithmic converters 117R, 117G, 117B, and a film parameter register 116, all connected substantially as shown. For the sake of simplicity in understanding their functional operations, the sensitometric and antilogarithmic converter assemblies 117R, 117G, 117B are illustrated and discussed as having separate corresponding sensitometric 112R, 112G, 112B and antilogarithmic 114R, 114G, 114B converters. However, as discussed further below, the corresponding sensitometric 112R, 112G, 112B and antilogarithmic 114R, 114G, 114B converters are preferably combined together as sensitometric and antilogarithmic converter assemblies 117R, 117G, 117B.

The logarithmic converters 108R, 108G, 108B receive corresponding input signals $R_F$, $G_F$, $B_F$ and provide corresponding output signals log $R_F$, log $G_F$, log $B_F$ which are received by the film masking matrix processor 110. The film masking matrix processor 110 provides corresponding output signals $R_{FM}$, $G_{FM}$, $B_{FM}$ which are received by the input color signal ports of the sensitometric converters 112R, 112G, 112B. The sensitometric converters 112R, 112G, 112B provide corresponding output signals $R_{FME}$, $G_{FME}$, $B_{FME}$ which are received by the antilogarithmic converters 114R, 114G, 114B. The antilogarithmic converters 114R, 114G, 114B provide corresponding output signals $R_D$, $G_D$, $B_D$ which are received by the display masking matrix processor 118 within the video parameter corrector 104 and by the encoder 106, as discussed below. The logarithmic 108R, 108G, 108B and antilogarithmic 114R, 114G, 114B converters preferrably operate according to base ten logarithms ($\log_{10}$).

The film parameter register 116 receives film color correction parameter data (discussed more fully below) via a film parameter interface 128, and provides the appropriate data to the parameter signal ports of the film masking matrix processor 110 via a processor interface 126 and to the individual sensitometric converters 112R, 112G, 112B via separate converter interfaces 130R, 130G, 130B.

The input signals $R_F$, $G_F$, $B_F$ are digital signals representing red, green and blue film color signals, which in turn represent red, green and blue colored optical film images, respectively. The input signals $R_F$, $G_F$, $B_F$ are supplied to the inputs of, and converted by, their respective logarithmic converters 108R, 108G, 108B to their logarithmic equivalents, i.e. "log $R_F$," "log $G_F$" and "log $B_F$," for color masking within the film masking matrix processor 110. Each of the logarithmic converters 108R, 108G, 108B comprises a look-up table ("LUT"), wherein the respective input signals $R_F$, $G_F$, $B_F$ address the contents thereof, which in turn, provide the respective logarithmic equivalent signals log $R_F$, log $G_F$, log $B_F$, which are then inputted into the film masking matrix processor 110. However, it should be understood that other conversion means can be used, as desired, such as digital adders or multipliers, a microprocessor, a reduced instruction set controller ("RISC"), a custom digital signal processor ("DSP"), a custom very large scale integrated circuit ("VLSI"), or a "spline generator."

Figure 2:
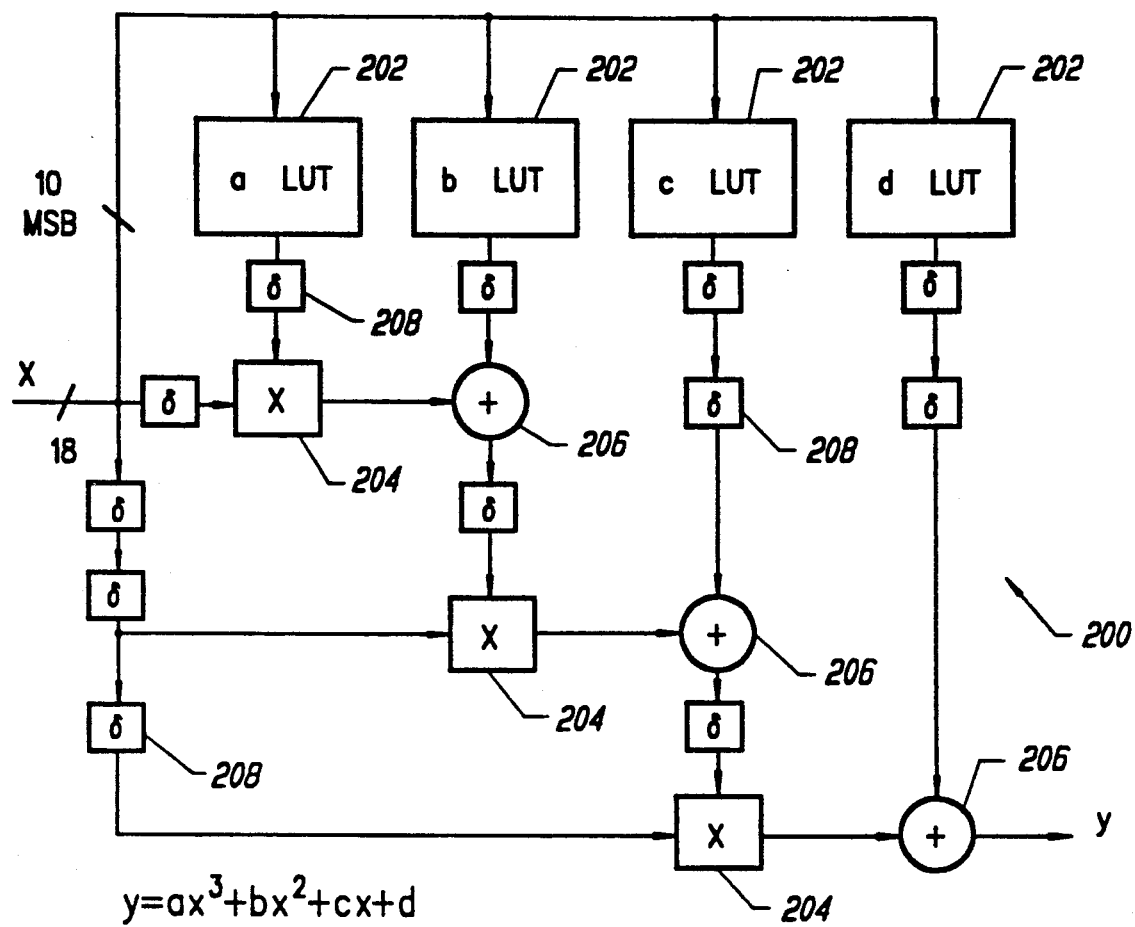
FIG. 2 illustrates a block diagram of a spline generator used in a preferred embodiment of the present invention.

Referring to FIG. 2, an exemplary spline generator 200 is illustrated and includes LUTs 202, multipliers 204, adders 206 and time delay units 208, connected as shown. This particular spline generator 200 has an output "y" and a transfer function:

$$y32\ ax^3 + bx^2 + cx + d$$

The input signal is split among the LUTs 202 and two time delay units 208, e.g. with its ten most significant bits representing addresses and going to the "a," "b," "c" and "d" LUTs and its remaining bits representing the input value "x" to be processed according to the spline generator's transfer function. The address bits going to the "a," "b," "c" and "d" LUTs address the memory locations therein. The contents of those memory locations provide the "a," "b," "c" and "d" values for the spline's transfer function. The remaining bits, representing the input "x" to be processed, are then processed according to the spline generator's transfer function.

By using such a spline generator 200, virtually all mathematical functions can be approximated with a relatively high degree of accuracy. Higher or lower order splines can be used depending upon the desired accuracy, but a cubic spline represents a good compromise between accuracy, complexity and speed.

Further, by using such a spline generator 200, the size of LUTs needed are smaller. Rather than accessing one very large LUT to obtain the appropriate output signal, e.g. the logarithmic equivalent of the input signal, much smaller LUTs can be used. For example, the LUTs 202 of FIG. 2 only need $2^{10}$ memory locations rather than $2^{18}$. This results in less costly circuit components and designs, as well as faster circuit operation.

Within the film masking matrix processor 110 the logarithmic equivalents log $R_F$, log $G_F$, log $B_F$ of the input signals $R_F$, $G_F$, $B_F$ are color masked in accordance with film masking matrix coefficients to produce corresponding color masked film signals $R_{FM}$, $G_{FM}$, $B_{FM}$. This masking compensates, i.e. corrects, for crosstalk effects within the film color signals due to crosstalk between the red, green and blue emulsions of the original film stock. This masking is accomplished by modifying, e.g. scaling and mixing, the film color information contained within the respective film color signals log $R_F$, log $G_F$, log $B_F$. These color masking operations are performed substantially in accordance with the following formula:

$$\begin{bmatrix} R_{FM} \\ G_{FM} \\ B_{FM} \end{bmatrix} = \begin{bmatrix} F_{RR} & F_{RG} & F_{RB} \\ F_{GR} & F_{GG} & F_{GB} \\ F_{BR} & F_{BG} & F_{BB} \end{bmatrix} \begin{bmatrix} \log R_F \\ \log G_F \\ \log B_F \end{bmatrix} + \begin{bmatrix} C_{FR} \\ C_{FG} \\ C_{FB} \end{bmatrix}$$

where:

$R_{FM}$ = masked Red film signal
$G_{FM}$ = masked Green film signal
$B_{FM}$ = masked Blue film signal
$F_{Y}$ = film masking matrix coefficients (for contribution to "X"-colored film signal by "Y"-colored light)
$C_{FX}$ = film correction factors (for "X"-colored film signal)

The film masking matrix coefficients $F_{XY}$, as well as the film correction factors $C_{FX}$, are inputted into the film masking matrix processor 110 from the film parameter register 116 via a signal interface 126. In turn, the film parameter register 116 receives the film masking matrix coefficients $F_{XY}$ and film correction factors $C_{FX}$ from an outside source, e.g. a computer or keyboard input interface (not shown), Via a film parameter interface 128. These coefficients $F_{XY}$ and factors $C_{FX}$ can be modified as desired by entering new values (e.g. computed from identified color changes) or adjusting the default values via the film parameter interface 128.

The film masking matrix coefficients $F_{XY}$ have default values which can be determined (e.g. computed) from film data available on film data sheets provided by the film manufacturer or selected by the user. Alternatively, if little or no masking is deemed necessary or desirable, the "diagonal" coefficients (i.e. $F_{RR}$, $F_{GG}$, $F_{BB}$) can each be given a value of unity and the "off diagonal" coefficients (i.e. $F_{RG}$, $F_{RB}$, $F_{GB}$, $F_{GR}$, $F_{BR}$, $F_{BG}$) can each be given a value of zero.

Figure 3:
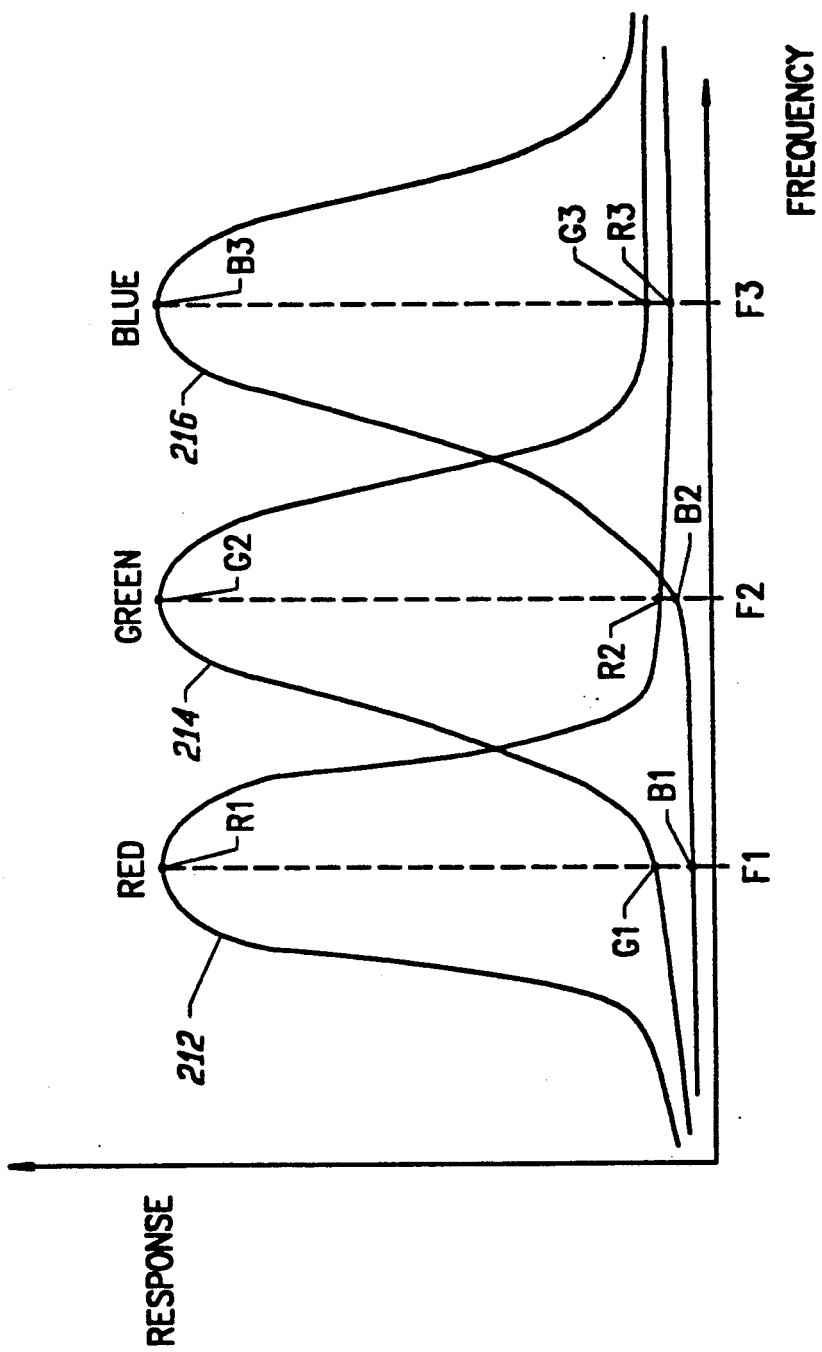
FIG. 3 illustrates exemplary response curves for red, green and blue film dyes and video display phosphors

Referring to FIG. 3, it can be seen by example how the default values can be determined. FIG. 3 illustrates exemplary red 212, green 214 and blue 216 "response" curves. The relative "responses" represented by these curves 212, 214, 216 can be the input film signals $R_F$, $B_F$, $G_F$ representing the respective relative responses of the red, green and blue film dyes to incoming frequencies of light (or alternatively, as discussed further below, the respective relative color responses of the display device, e.g. the relative responses of the colored phosphors of a cathode ray tube to input voltages).

The film masking matrix coefficients $F_{XY}$ are determined by "inverting" the film dyes' natural masking. For example, an apparent "red" signal representing a color corresponding to the frequency F1 will actually be due in part to the true "red," "green" and "blue" signals. This can be seen in FIG. 3 by the overlap of the color component response curves where red R1, green G1 and blue B1 responses to incoming light frequency F1 combine to produce an apparent red signal. Mathematically, this can be expressed by the following coupled formulas which are the "inverse" of those discussed above:

$$\begin{bmatrix} \log R_F \\ \log G_F \\ \log B_F \end{bmatrix} = \begin{bmatrix} IF_{RR} & IF_{RG} & IF_{RB} \\ IF_{GR} & IF_{GG} & IF_{GB} \\ IF_{BR} & IF_{BG} & IF_{BB} \end{bmatrix} \begin{bmatrix} R_{FM} \\ G_{FM} \\ B_{FM} \end{bmatrix} + \begin{bmatrix} IC_{FR} \\ IC_{FG} \\ IC_{FB} \end{bmatrix}$$

where:
$R_{FM}$ = masked (true) Red film signal
$G_{FM}$ = masked (true) Green film signal
$B_{FM}$ = masked (true) Blue film signal
$IF_{XY}$ = inverse film masking coefficients obtained directly from the relative response curves and normalized (for contribution to "X"-colored film signal by "Y"-colored light)
$IC_{FX}$ = inverse film correction factors (for "X"-colored film signal)

Using the exemplary relative response curves of FIG. 3, the inverse film masking coefficients $IF_{XY}$ would be:

$$\begin{bmatrix} IF_{RR} & IF_{RG} & IF_{RB} \\ IF_{GR} & IF_{GG} & IF_{GB} \\ IF_{BR} & IF_{BG} & IF_{BB} \end{bmatrix} = \begin{bmatrix} R1N & G1N & B1N \\ R2N & G2N & B2N \\ R3N & G3N & B3N \end{bmatrix}$$

where:
RMN = normalized red response at frequency FM
GMN = normalized green response at frequency FM
BMN = normalized blue response at frequency FM The film masking matrix coefficients $F_{XY}$ and film correction factors $C_{XY}$ can then be determined by solving the above set of three linear equations by standard methods, e.g. by inverting the matrix above to "invert" the physical film transformation due to the colored dyes' responses. Thus, for example, some typical default values for the film masking matrix coefficients $F_{XY}$ for Kodak ® 5247 color negative film would be:

$$\begin{bmatrix} F_{RR} & F_{RG} & F_{RB} \\ F_{GR} & F_{GG} & F_{GB} \\ F_{BR} & F_{BG} & F_{BB} \end{bmatrix} = \begin{bmatrix} 0.89 & 0.07 & 0.04 \\ 0.02 & 0.94 & 0.04 \\ 0.02 & 0.14 & 0.84 \end{bmatrix}$$

The film correction factors $C_{FX}$ and inverse film correction factors $IC_{FX}$ represent fixed (e.g. dc) signal parameters and can be used to provide additional signal amplification or attenuation. However, typically these factors $C_{FX}$ will each be given a value of zero (i.e. unity in terms of original signal amplification or attenuation).

Figure 4A:
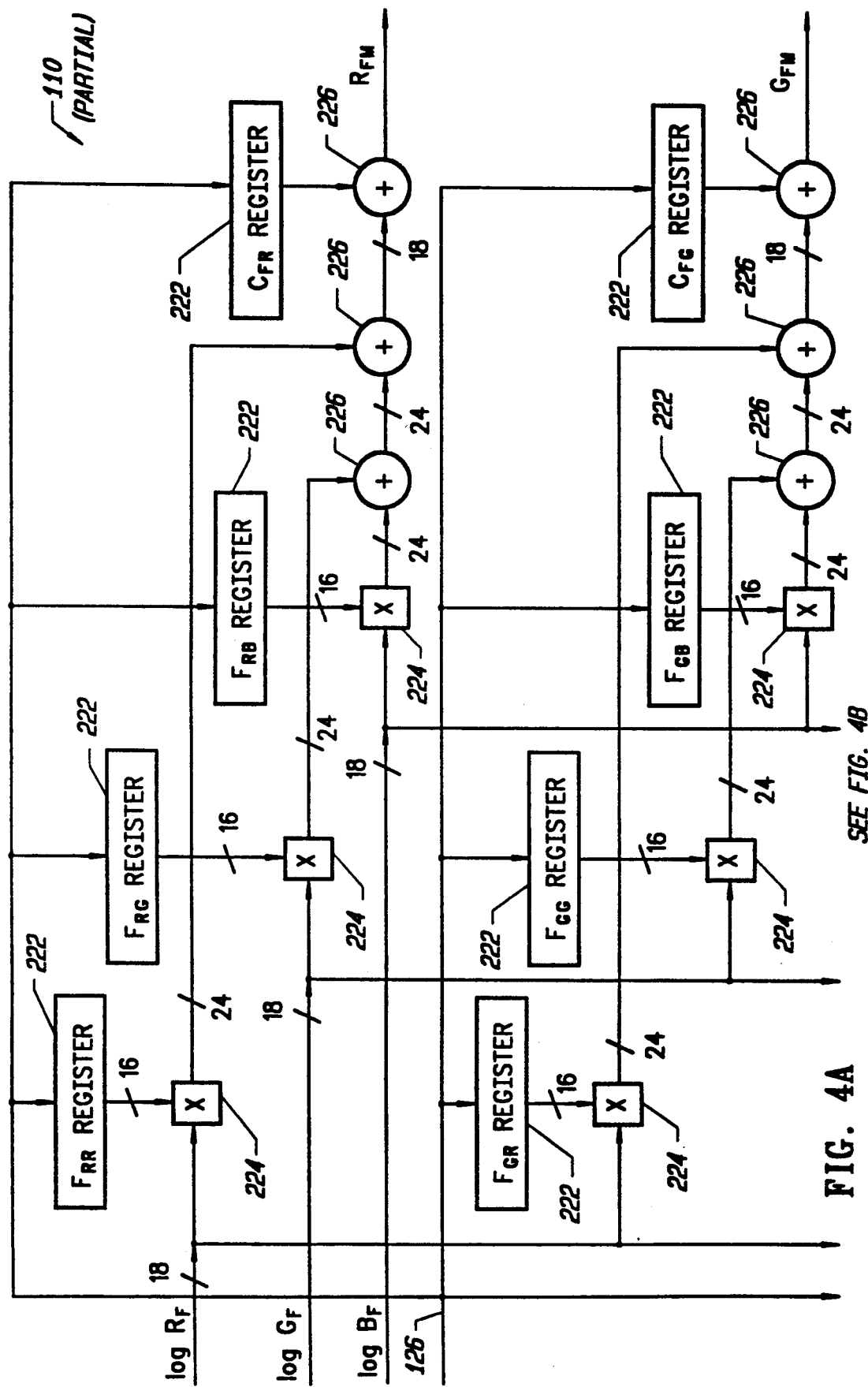
FIGS. 4A-4B illustrates a block diagram of a film masking matrix processor used in a preferred embodiment of the present invention.
Figure 4B:
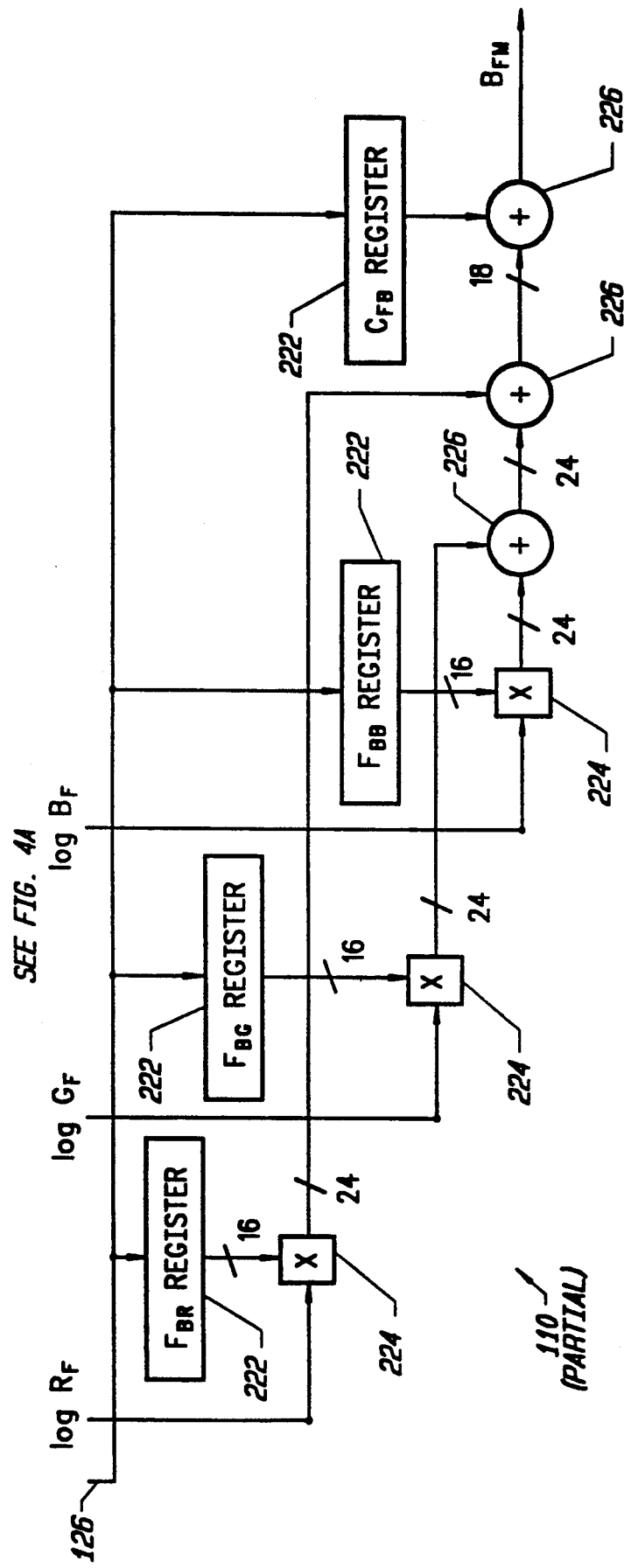

Referring to FIGS. 4A and 4B, the film masking matrix processor 110 comprises registers 222, multipliers 224 and adders 226, connected as shown, to operate according the foregoing formula. However, it should be understood that other masking means can be used, such as a microprocessor, a RISC, or a custom DSP or VLSI.

The color masked film signals $R_{FM}$, $G_{FM}$, $B_{FM}$ outputted from the film masking matrix processor 110 are then separately sensitometrically and antilogarithmically converted by their respective sensitometric and antilogarithmic converter assemblies 117R, 117G, 117B. Each color masked film signal $R_{FM}$, $G_{FM}$, $B_{FM}$ is preferably sensitometrically converted substantially in accordance With a Hurter-Driffield ("HD") characteristic curve, which represents the relationship between film dye density and the logarithm of the film dye exposure. An exemplary graphical representation of an HD characteristic curve can be seen in FIG. 5. The color masked film signals $R_{FM}$, $G_{FM}$, $B_{FM}$, each representing red, green and blue film dye densities with film masking (i.e. with crosstalk effects minimized or eliminated), are converted by their respective sensitometric converters 112R, 112G, 112B into corresponding logarithmic exposure equivalents $R_{FME}$, $G_{FME}$, $B_{FME}$. This sensitometric conversion is done substantially in accordance with the following formula:

$$E_X = E_{XO}[(10^{Ax(Dx-Dxl)}-1)/(1-10^{Bx(Dx-Dxu)})]^{Nx}$$

where:
$E_X$ = exposure level of "X"-colored film dye (represented by the associated output signal $R_{FM}$, $G_{FM}$, or $B_{FM}$)
$E_{XO}$ = antilog$_{10}${0.8/ASA − Nx[0.1 − +log$_{10}$(1 − 10$^{-0.1}$)]}
Ax = measure of asymmetry of toe ("toe character") of "X"-colored film dye's characteristic curve = |Dxd − Dxl| [default value: Ax = −1] ≈ log$_{10}$(1 − 10$^{(Dxd-Dxl)}$)/(Dxd − Dxl)
Dxd = "toe" density of "X"-colored film dye (see FIG. 5)
Dxl = minimum (base + fog) density of "X"-colored film dye*
Dx = density of "X"-colored film dye (represented by the associated input signal $R_{FME}$, $G_{FME}$ or $B_{FME}$)
Bx = measure of asymmetry of shoulder ("shoulder character") of "X"-colored film dye's characteristic curve = |Dxu − Dxc| [default value: Bx = 1] ≈ log$_{10}$(1 − 10$^{(Dxc-Dxu)}$)/(Dxc − Dxu)
Dxu = maximum (saturation) density of "X"-colored film dye
Dxc = "shoulder" density of "X"-colored film dye (see FIG. 5)
Nx ≈ 1/γ
ASA = film speed*
*available from film manufacturer's data sheet.

The sensitometric conversion performed by the converters 112R, 112G, 112B according to the foregoing formula uses film color correction parameters associated with film characteristics. These film color correction parameters include the minimum (i.e. base plus fog) Dxl and maximum (i.e. saturation) Dxu densities of the respective colored film dyes, the respective toe Ax and shoulder Bx characters of the film dyes' characteristic curves, gamma γ and the film speed ASA. These film color correction parameters are provided to each of the converters 112R, 112G, 112B by the film parameter register 116 via separate signal interface lines 130R, 130G, 130B. The film parameter register 116 receives the film color correction parameters from an external source, e.g. a computer or keyboard input interface (not shown), via the film parameter interface 128.

The corrected, sensitometrically converted film color signals $R_{FME}$, $G_{FME}$, $B_{FME}$ (corrected for film dye crosstalk effects and the nonlinear characteristics of exposed film dye densities) are then separately antilogarithmically converted, i.e. exponentiated, back to their linear equivalent signals $R_D$, $G_D$, $B_D$ by their respective antilogarithmic converters 114R, 114G, 114. These signals $R_D$, $G_D$, $B_D$ are then available for color correction in accordance With video parameters within the video parameter corrector 104 or encoding within the encoder 106 (discussed more fully below).

Functionally, each of the sensitometric and antilogarithmic converter assemblies 117R, 117G, 117B comprises a sensitometric converter 112R, 112G, 112B and an antilogarithmic converter 114R, 114G, 114B. Each of the sensitometric converters 112R, 112G, 112B can comprise a LUT, wherein the respective input signals $R_{FM}$, $G_{FM}$, $B_{FM}$ address the contents thereof, which in turn, provide the respective converted signals $R_{FME}$, $G_{FME}$, $B_{FME}$. Similarly, each of the antilogarithmic converters 114R, 114G, 114B can comprise a LUT, wherein the respective input signals $R_{FME}$, $G_{FME}$, $B_{FME}$ address the contents thereof, which in turn, provide the respective linear equivalent signals $R_D$, $G_D$, $B_D$. However, as shown in FIG. 6, in a preferred embodiment of each of the sensitometric and antilogarithmic converter assemblies 117R, 117G, 117B, the sensitometric and antilogarithmic conversions are functionally combined into a single LUT.

Figure 6:
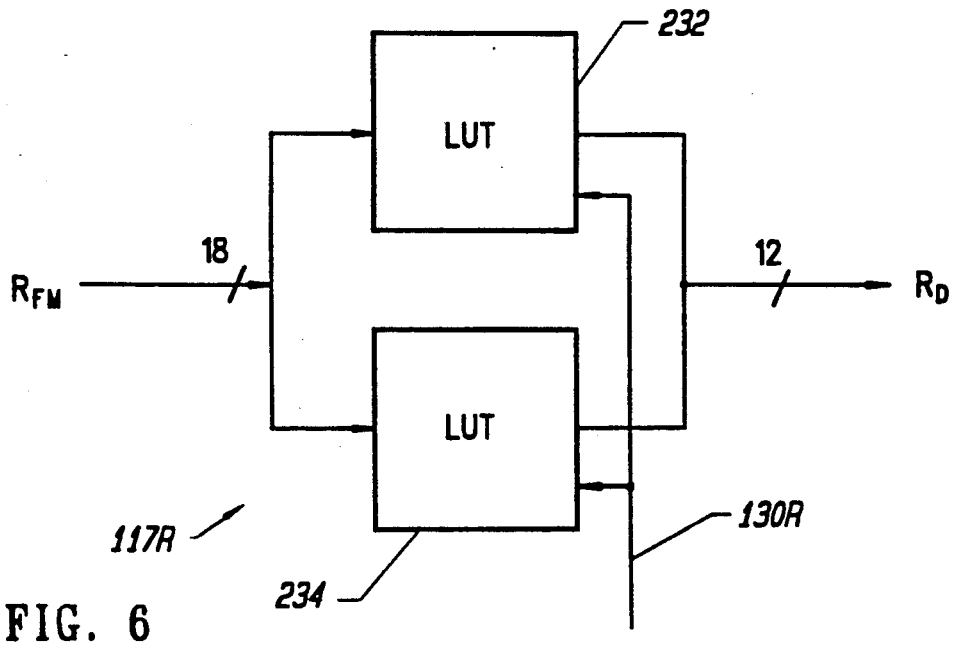
FIG. 6 illustrates a block diagram of a sensitometric converter in accordance with the present invention.

Referring to FIG. 6, a preferred embodiment of the "red" sensitometric and antilogarithmic converter assembly 117R comprises two LUTs 232, 234 coupled for multiplexed operation, as shown. The color masked red film signal $R_{FM}$ is coupled to the inputs of both LUTs 232, 234. Both LUTs 232, 234 are also coupled to the "red" converter interface 130R for selectively receiving further or updated film parameter data (as discussed above). Under synchronous control by the controller 107 (discussed above), the LUTs 232, 234 alternate between (1) receiving the color masked red film signal $R_{FM}$ and outputting the corresponding converted red film signal $R_{FME}$, and (2) receiving further or updated film parameter data via the "red" converter interface 130R. This multiplexed operation allows the circuit of FIG. 6 to run faster than a single LUT circuit, where the LUT would have to be time-shared between converting film signals and receiving more film parameter data.

It should be understood that other conversion means can be used instead of LUTs, as desired. For example, digital adders or multipliers, a microprocessor, a RISC, a custom DSP or VLSI, or a spline generator (as discussed above for FIG. 2) can be used as well.

As discussed in more detail below, the video parameter corrector 104 comprises a display masking matrix processor 118, separate auxiliary processors 120R, 120G, 120B, separate video standard converters 122R, 122G, 122B, and a display parameter register 124, all connected as shown. The display masking matrix processor 118 receives the corrected film color signals $R_D$, $G_D$, $B_D$ and provides corresponding output signals $R_{DM}$, $G_{DM}$, $B_{DM}$ which are received by the auxiliary processors 120R, 120G, 120B. The auxiliary processors 120R, 120G, 120B provide corresponding output signals $R_{DMA}$, $G_{DMA}$, $B_{DMA}$ which are received by the video standard converters 122R, 122G, 122B. The video standard converters 122R, 122G, 122B provide corresponding output signals $R_S$, $G_S$, $B_S$ which are received by the input color signal ports of the encoder 106 (discussed below).

The corrected film color signals $R_D$, $G_D$, $B_D$ are received by the display masking matrix processor 118 from the antilogarithmic converters 114R, 114G, 114B (within the film parameter corrector 102, as discussed above) for color masking to compensate for crosstalk effects within the entire system (e.g. between the final display device, such as a cathode ray tube display (not shown), and the scanning device, such as an image orthicon (not shown)). The display masking matrix processor 118 outputs these compensated signals as display masked signals $R_{DM}$, $G_{DM}$, $B_{DM}$. This masking provides for corrected video signal characteristics, such as hue, saturation and value, and is accomplished by modifying, e.g. scaling and mixing, the display color information contained within the respective corrected film color signals $R_D$, $G_D$, $B_D$. This display masking is performed substantially in accordance with the following formula:

$$\begin{bmatrix} R_{DM} \\ G_{DM} \\ B_{DM} \end{bmatrix} = \begin{bmatrix} D_{RR} & D_{RG} & D_{RB} \\ D_{GR} & D_{GG} & D_{GB} \\ D_{BR} & D_{BG} & D_{BB} \end{bmatrix} \begin{bmatrix} R_D \\ G_D \\ B_D \end{bmatrix} + \begin{bmatrix} C_{DR} \\ C_{DG} \\ C_{DB} \end{bmatrix}$$

where:
$R_{DM}$ = masked Red display signal
$G_{DM}$ = masked Green display signal
$B_{DM}$ = masked Blue display signal
$D_{XY}$ = display masking matrix coefficients (for contribution to "X"-colored display signal by "Y"-colored film signal)
$C_D$ = display correction factors (for "X"-colored display signal)

The display masking matrix coefficients $D_{XY}$ and the display correction factors $C_{DX}$ are provided to the display masking matrix processor 118 by the display parameter register 124 via a signal interface 132. In turn, the display parameter register 124 receives the coefficients $D_{XY}$ and factors $C_{DX}$ from an outside source, such as a computer or keyboard input interface (not shown) via a display parameter interface 134. These coefficients $D_{XY}$ and factors $C_{DX}$ can be modified as desired by entering new values or adjusting the default values via a computer or keyboard interface (not shown) coupled to the display parameter interface 134.

The display masking matrix coefficients $D_{XY}$ have default values which are determined by initially calibrating the system and computing their individual values. This initial calibration can be accomplished by inputting reference color information (e.g. scanning red, green and blue standard images) and measuring the system response thereto (e.g. measuring the respective responses to the scanned red, green and blue standard images). Based upon data obtained from this initial calibration, the default values of the display masking matrix coefficients $D_{XY}$ can then be computed in accordance with the discussion above for FIG. 3. Alternatively, if little or no masking is deemed necessary or desirable, the "diagonal" coefficients (i.e. $D_{RR}$, $D_{GG}$, $D_{BB}$) can each be given a value of unity and the "off diagonal" coefficients (i.e. $D_{RG}$, $D_{RB}$, $D_{GB}$, $D_{GR}$, $D_{BR}$, $D_{BG}$) can each be given a value of zero.

The display correction factors $C_{DX}$ represent fixed (e.g. dc) signal parameters and can be used to provide additional signal amplification or attenuation. However, typically these factors $C_{DX}$ will each be given a value of zero (i.e. unity in terms of original signal amplification or attenuation).

Figure 7A:
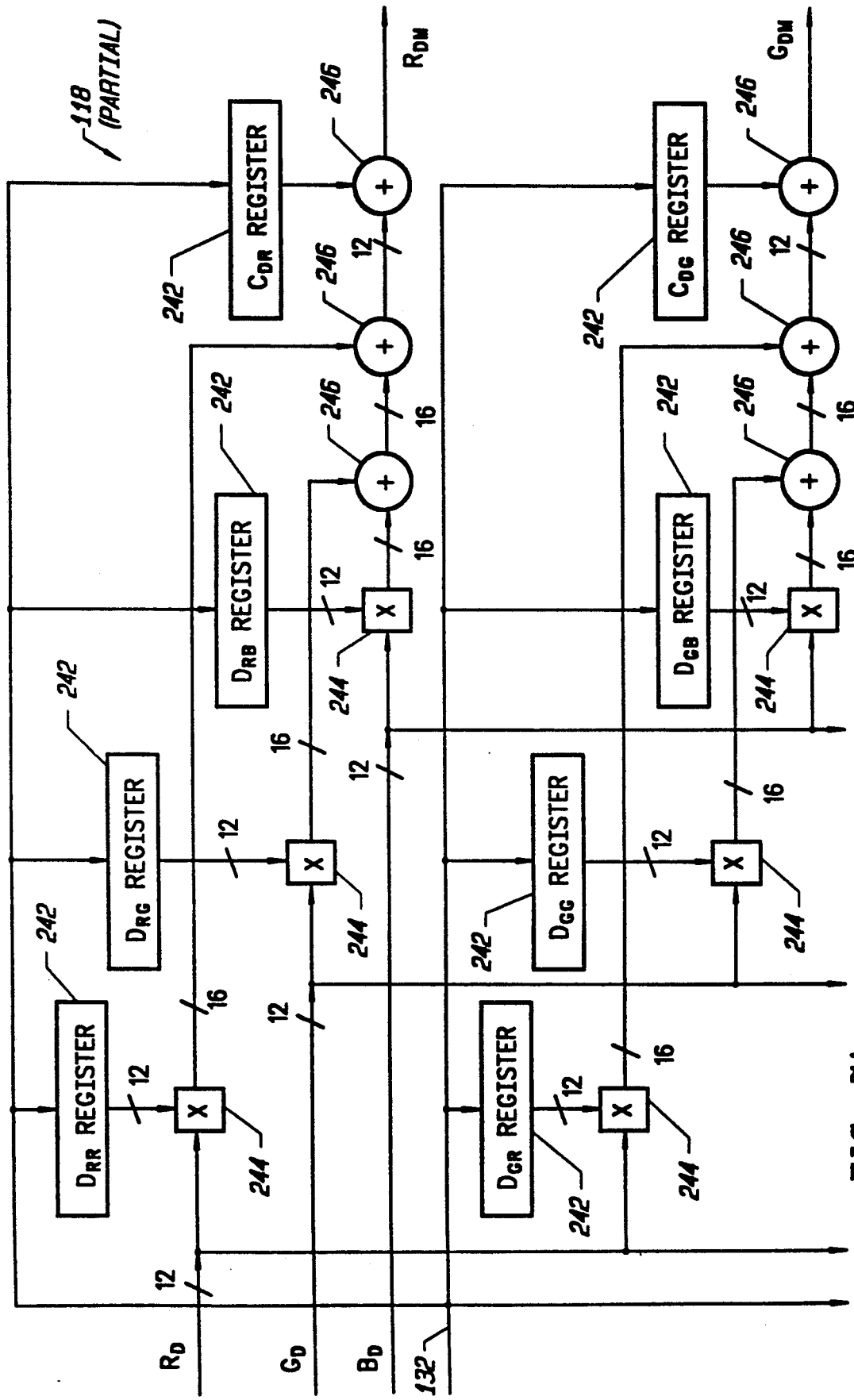
FIGS. 7A-7B illustrate a block diagram of a display masking matrix processor used in a preferred embodiment of the present invention.
Figure 7B:
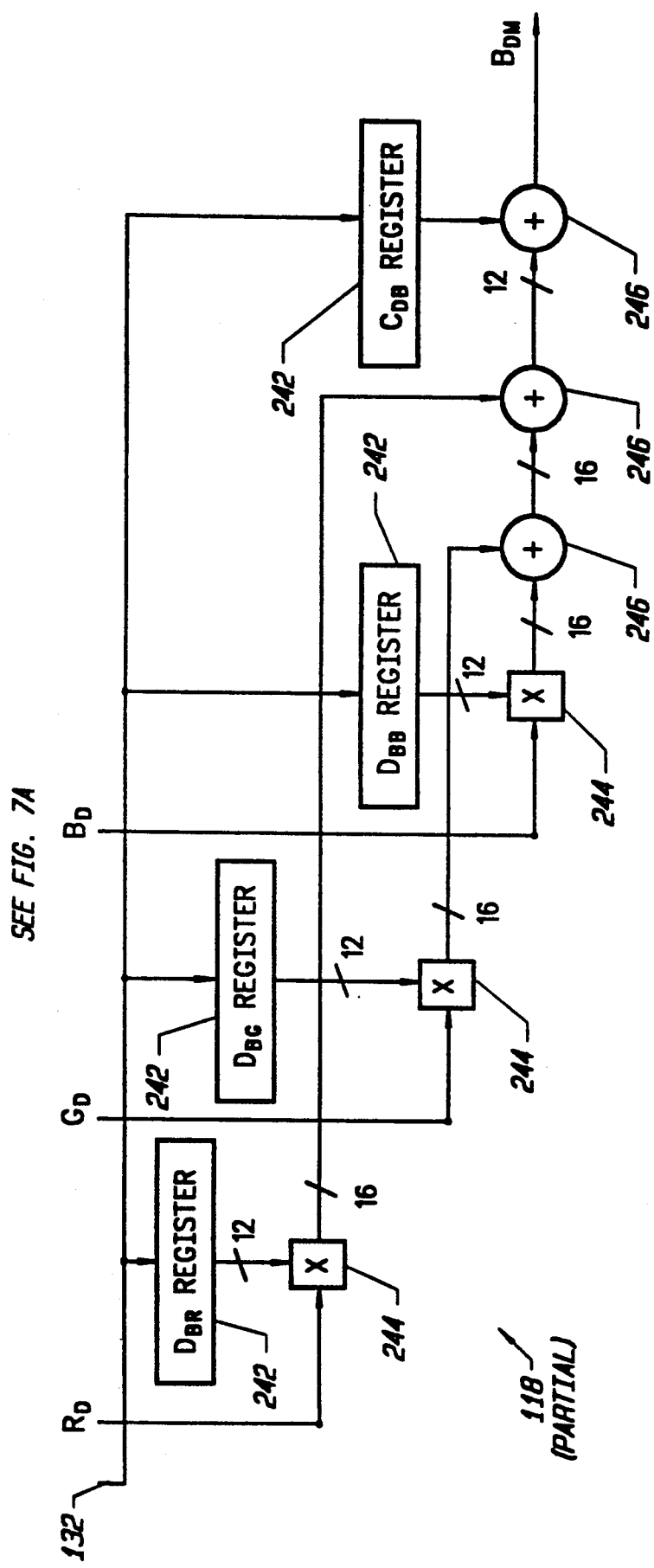

Referring to FIGS. 7A and 7B, the display masking matrix processor 118 comprises registers 242, multipliers 244 and adders 246, connected as shown, to operate according the foregoing formula. However, it should be understood that other masking means can be used, such as a microprocessor, a RISC, or a custom DSP or VLSI.

The display masked signals $R_{DM}$, $G_{DM}$, $B_{DM}$ are then separately processed in auxiliary processors 120R, 120G, 120B. The auxiliary processors 120R, 120G, 120B allow each of the display masked signals $R_{DM}$, $G_{DM}$, $B_{DM}$ to be "fine tuned" according to subjective color correction parameters provided to the auxiliary processors 120R, 120G, 120B via separate signal interfaces 136R, 136G, 136B, the display parameter register 124 and the display parameter interface 134.

For example, this subjective color correction can be done substantially on a graphical point-by-point basis within each respective color space, i.e. within the color saturation range, for each of the display masked signals $R_{DM}$, $G_{DM}$, $B_{DM}$. A typical result of such a subjective correction can appear as illustrated in the exemplary graph of FIG. 8. This subjective color correction is the subject of the above-mentioned commonly assigned, copending patent applicaiton having Ser. No. 7/687,962, entitled "Digital Video Processing System With Gross and Fine Color Correction Modes" and filed by Capitant et al. on Apr. 19, 1991, the specification of which is incorporated herein by reference.

After being outputted from the auxiliary processors 120R, 120G, 120B, the processed video color signals $R_{DMA}$, $G_{DMA}$, $B_{DMA}$ are then separately converted according to video color standards within their respective video standard converters 122R, 122G, 122B. This video color standard conversion is a form of video color signal pre-emphasis, e.g. signal amplitude scaling, which is required to ensure that the resulting video color signals $R_S$, $G_S$, $B_S$ conform to the applicable display standard. This conversion can be done according to any video or television color standard (e.g. NTSC, PAL or SECAM), as desired. However, in a preferred embodiment of the present invention, the display standard conforms to the SMPTE 240 M high definition television ("HDTV") standard. The output versus input characteristic curve for this standard can be seen in FIG. 9. This video color standard conversion is performed substantially in accordance with the following formula:

$$V_{XC} = 1.1115 L_{XC}^{0.045} - 0.115, \text{ for } L_{XC} \geq 0.0228$$
$$= 4 L_{XC}, \text{ for } L_{XC} < 0.0228$$

where:

$V_{XC}$ = reference SMPTE 240 M video camera output voltage for "X"-colored video signal (represented by the associated output signal $R_S$, $G_S$ or $B_S$)

$L_{XC}$ = incident "X"-colored light producing $V_{XC}$ (represented by the associated input signal $R_{DMA}$, $G_{DMA}$ or $B_{DMA}$)

Each of the video standard converters 122R, 122G, 122B comprises a LUT, wherein the input signals $R_{DMA}$, $G_{DMA}$, $B_{DMA}$ address the contents thereof, which in turn, provide the video standard signals $R_S$, $G_S$, $B_S$. However, it should be understood that other conversion means can be used, as desired, such as digital adders or multipliers, a microprocessor, a RISC, a custom DSP or VLSI, or a spline generator. Further, these video standard converters 122R, 122G, 122B can alternatively be selectively provided with control signals and parametric signals via signal interfaces 138R, 138G, 138B, the display parameter register 124 and display parameter interface 134, as desired.

The standardized video color signals $R_S$, $G_S$, $B_S$ are inputted into the input color signal ports of the encoder 106 for selective encoding of the color correction parameters. As discussed further below, the encoder 106 provides the capability of selectively encoding the color correction parameters discussed above within the individual output color signals R, G, B. In other words, the encoder 106 can selectively encode separate data representing the aforementioned color correction parameters into the individual output color signals R, G, B.

Therefore, rather than merely outputting only corrected color signals, either corrected or uncorrected color signals can be selectively outputted along with their respective color correction parameter data. This can be an appealing feature when it is desired to have both the color signals, either corrected or uncorrected, and their respective appropriate color correction parameters available (e.g. for display or transference back to film). Otherwise, if the color signals are provided only in their color corrected form, information regarding their initial uncorrected form is lost.

The encoder 106 receives at its parameter signal ports the film color correction parameters from the film parameter register 116 via a film color correction parameter interface 140. The encoder 106 also receives at its parameter signal ports the display color correction parameters from the display parameter register 124 via a display color correction parameter interface 142. Further, the encoder 106 selectively receives at its color signal input ports the fully corrected, standardized video color signals $R_S$, $G_S$, $B_S$ from the video standard converters 122R, 122G, 122B (within the video parameter corrector 104, as discussed above); or alternatively, the encoder 106 selectively receives at its color signal input ports the initial, uncorrected input film color signals $R_F$, $G_F$, $B_F$ via direct connections 144R, 144G, 144B bypassing the film parameter corrector 102 and video parameter corrector 104; or further alternatively, the encoder 106 selectively receives at its color signal input ports the partially corrected film color signals $R_D$, $G_D$, $B_D$ via direct connections 146R, 146G, 146B bypassing the video parameter corrector 104.

Figure 10:
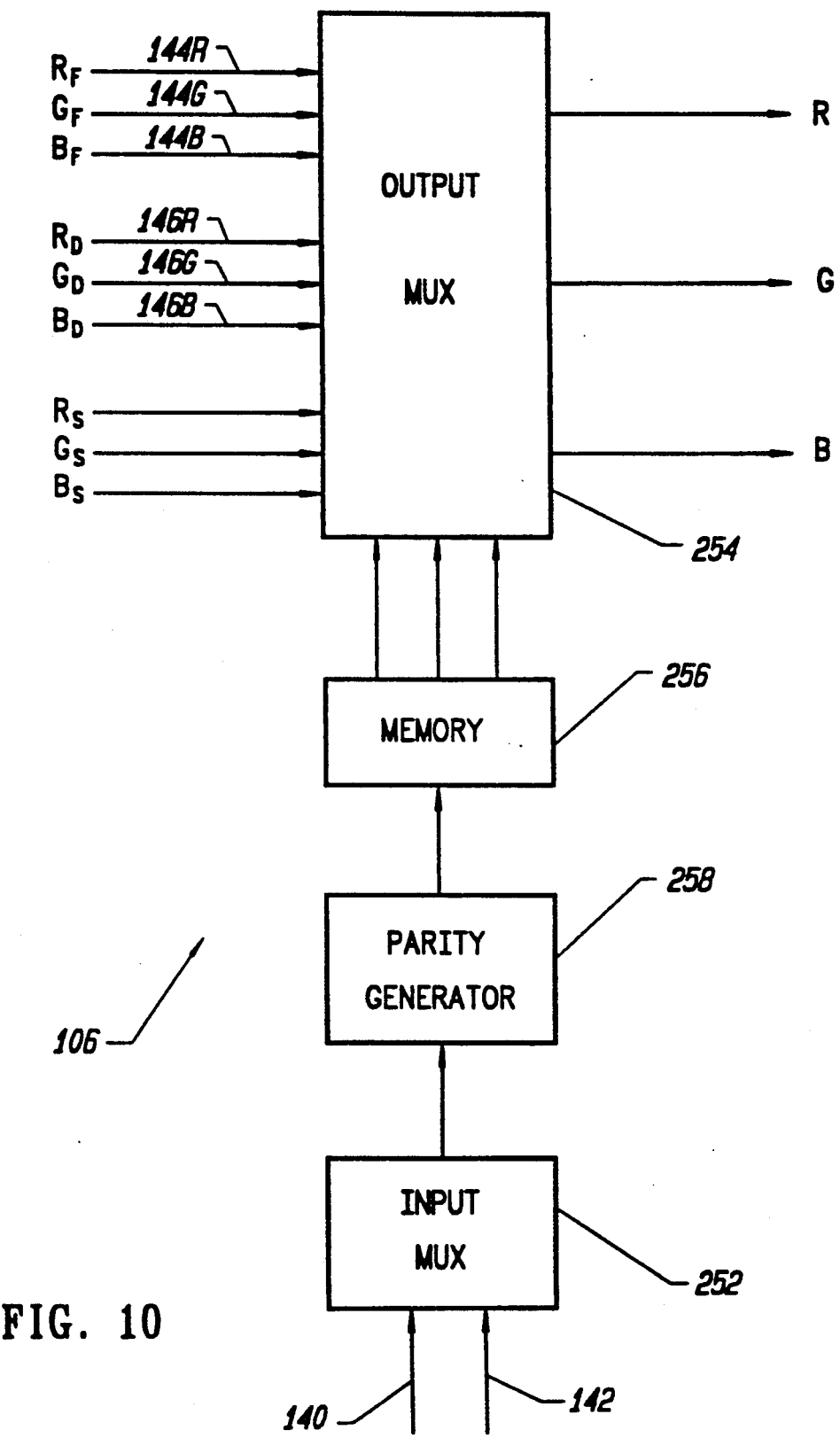
FIG. 10 illustrates a block diagram of an encoder in accordance with the present invention.

Referring to FIG. 10, the encoder 106 comprises multiplexers 252, 254, a memory 256 and a parity generator 258. (It should be understood, however, that other encoding means can be used, such as a microprocessor, a RISC, or a custom DSP or VLSI.) The input multiplexer 252 receives the parameter data to be encoded via the film 140 or display 142 color correction parameter interfaces. The selected data is given proper parity by the parity generator 258 (discussed below) and then stored in the memory 256. The stored data are then made part of the output signals R, G, B, by being selectively multiplexed into the fully corrected video color signals $R_S$, $G_S$, $B_S$, the partially corrected film color signals $R_D$, $G_D$, $B_D$, or the uncorrected film color signals $R_F$, $G_F$, $B_F$.

The encoder 106 selectively encodes the film or display color correction parameters as separate data either into the fully corrected video color signals $R_S$, $G_S$, $B_S$, into the partially corrected film color signals $R_D$, $G_D$, $B_D$, or into the uncorrected film color signals $R_F$, $G_F$, $B_F$, as desired. The film color correction parameter data encoded within the output color signals R, G, B can include the film masking matrix coefficients $F_{XY}$, the film correction factors $C_{FX}$, as well as any or all of the correction parameters used for the sensitometric conversion, as discussed above. Further, the display color correction parameter data encoded within the output color signals R, G, B can include the display masking matrix coefficients $D_{XY}$, the display correction factors $C_{DX}$, as well as any of the correction parameters used by the auxiliary processors 120R, 120G, 120B or video standard converters 122R, 122G, 122B, as discussed above.

For example, display color correction parameter data representing a desired video color standard (e.g. SMPTE 240M, NTSC, PAL, SECAM, etc.) can be provided to the parameter signal ports of the encoder 106 via the display color correction parameter interface 142 and display parameter register 124. Such display color correction parameter data can be supplied to the display parameter register 124 via the display parameter interface 134 from an outside source, such as a computer or keyboard input interface (not shown). In accordance with this display color correction parameter data and the inputted color signals (e.g. uncorrected $R_F$, $G_F$, $B_F$, partially corrected $R_D$, $G_D$, $B_D$, or fully corrected $R_S$, $G_S$, $B_S$), the encoder 106 can then generate appropriate video color standard data for encoding the output color signals R, G, B.

This encoding can be done according to many encoding techniques known in the art. For example, the respective color correction parameter data can be inserted (e.g. summed) into a portion of the output color signals R, G, B, e.g. into the vertical intervals. An exemplary SMPTE 240 M digital video data standard is illustrated in FIG. 11 which can be used for encoding color correction parameter data in this manner.

Figure 11:
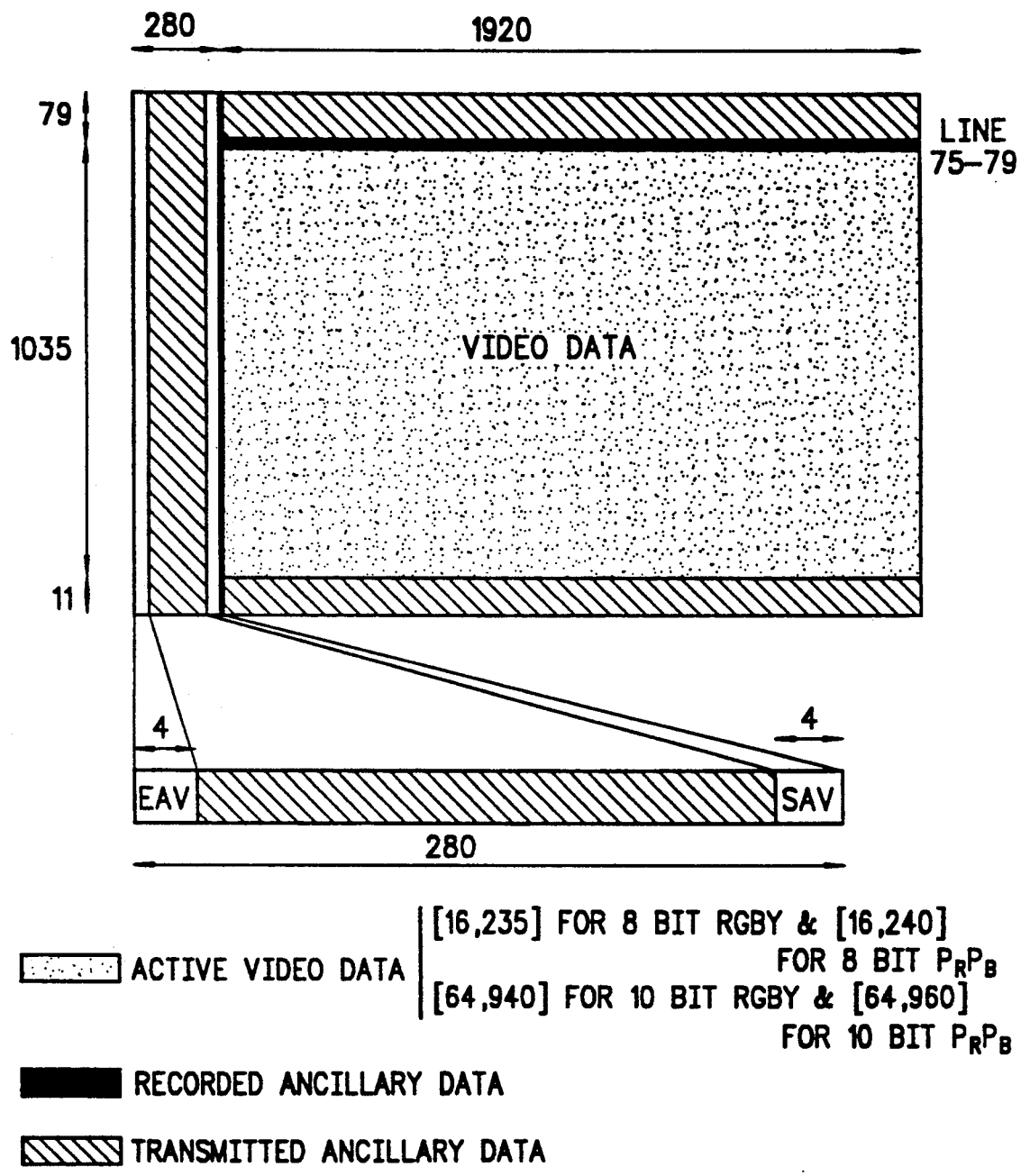
FIG. 11 illustrates an exemplary SMPTE 240 M digital video data standard for use with the present invention.

Referring to FIG. 11, active video data occupies 1035 lines (e.g. lines 80-1114) with 1920 pixels each (e.g. pixels 281-2200) in an SMPTE 240 M video frame. The vertical interval has 90 lines of 1920 pixels each, with some lines at the "top" (e.g. lines 1-79) and some lines at the "bottom" of the video frame (e.g. lines 1115-1125). The horizontal interval has 1125 lines (e.g. lines 1-1125), with 280 pixels each (e.g. pixels 1-280), all grouped at the "left" of the video frame.

The color correction parameter data can be encoded into lines 75-79 in the vertical interval of the video frame. These lines are generally reserved for ancillary data which is transmitted with all other data and retained for further processing or recording, similar to the active video data. The remainder of the lines in the vertical interval are generally only transmitted and not retained.

The ancillary data is made up of data "words," each of which corresponds to and has as many bits as each pixel of active video data (e.g. eight or ten bits). An exemplary format for the ancillary data includes a six-word preamble and a data field as follows:

Preamble:

| | MSB | | | | | | | | LSB | |
|---|---|---|---|---|---|---|---|---|---|---|
| Word 1 | 0 | 0 | 0 | 0 | 0 | 0 | 0 | 0 | 0 | 0 |
| Word 2 | 1 | 1 | 1 | 1 | 1 | 1 | 1 | 1 | 0 | 0 |
| Word 3 | 1 | 1 | 1 | 1 | 1 | 1 | 1 | 1 | 0 | 0 |
| Word 4 | $T_7$ | $T_6$ | $T_5$ | $T_4$ | $T_3$ | $T_2$ | $T_1$ | $T_0$ | 0 | 0 |
| Word 5 | 0 | $D_{11}$ | $D_{10}$ | $D_9$ | $D_8$ | $D_7$ | $D_6$ | $P_0$ | 0 | 0 |
| Word 6 | 0 | $D_5$ | $D_4$ | $D_3$ | $D_2$ | $D_1$ | $D_0$ | $P_0$ | 0 | 0 |

Data Field:

| | | | | | | | | | | |
|---|---|---|---|---|---|---|---|---|---|---|
| Word N | $X_6$ | $X_5$ | $X_4$ | $X_3$ | $X_2$ | $X_1$ | $X_0$ | $P_0$ | 0 | 0 |

⟵ (8 bit systems) ⟶
⟵ (10-bit systems) ⟶ where: $\{T_i\}$ = data type
$\{D_i\}$ = data word count
$P_0$ = odd parity bit

Each line in the horizontal interval generally includes four pixels at both the start and end thereof. The first four pixels are for the "end of active video" (EAV) data field, and the last four pixels are for the "start of active video" (SAV) data field.

The EAV and SAV data are made up of data "words," each of which corresponds to and has as many bits as each pixel of active video data (e.g. eight or ten bits). The format for the EAV and SAV data is as follows:

| | MSB | | | | | | | | LSB | |
|---|---|---|---|---|---|---|---|---|---|---|
| Word 1 | 1 | 1 | 1 | 1 | 1 | 1 | 1 | 1 | 1 | 1 |
| Word 2 | 0 | 0 | 0 | 0 | 0 | 0 | 0 | 0 | 0 | 0 |
| Word 3 | 0 | 0 | 0 | 0 | 0 | 0 | 0 | 0 | 0 | 0 |
| Word 4 | 1 | F | V | H | $P_3$ | $P_2$ | $P_1$ | $P_0$ | 0 | 0 |

⟵ (8 bit systems) ⟶
⟵ (10-bit systems) ⟶

| H | F | V | $P_3$ | $P_2$ | $P_1$ | $P_0$ |
|---|---|---|---|---|---|---|
| 0 | 0 | 0 | 0 | 0 | 0 | 0 |
| 0 | 0 | 1 | 1 | 1 | 0 | 1 |
| 0 | 1 | 0 | 0 | 1 | 1 | 1 |
| 0 | 1 | 1 | 1 | 1 | 0 | 0 |
| 1 | 0 | 0 | 1 | 1 | 0 | 1 |
| 1 | 0 | 1 | 0 | 1 | 1 | 0 |
| 1 | 1 | 0 | 1 | 0 | 1 | 0 |
| 1 | 1 | 1 | 0 | 0 | 0 | 1 | where: F = 0, during video field 1
      = 1, during video field 2
V = 1, during field blanking
  = 0, elsewhere
H = 0, in SAV
  = 1, in EAV
$\{P_i\}$ = parity This encoding of the color correction parameters can be done similar to the encoding of field or frame marking data disclosed in a commonly assigned, copending Pat. application having Ser. No. 07/699,928, entitled "Film-to-Video Frame Image Conversion Apparatus and Method for Selectively Identifying Video Fields and Frames" and filed by Capitant et al. on May 14, 1991, the specification of which is incorporated herein by reference.

The signal color correction and color correction parameter data encoding, discussed above, can be selectively done on any basis. For example, color correction or encoding can be done on a frame-by-frame or scene-by-scene basis, as desired. Furthermore, if desired, this color correction or encoding can be done on a field-by-field basis to modify or encode data into individual video fields. This flexibility, due in no small part to the digital implementation of the invention, facilitates many editing operations, such as dissolving, fading and scene-to-scene (or even field-to-field or frame-to-frame) color matching.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A digital film color corrector for correcting a film color signal representing a portion of a colored optical film image in accordance with a plurality of color correction parameters associated with color film characteristics, the color corrector comprising:
    a color signal port for receiving a digital film color signal representing a color film dye density;
    a parameter signal port for receiving a plurality of digital film color correction signals representing a plurality of color film characteristics including film color masking; and
    film color corrector means for selectively correcting the received digital film color signal in accordance with the received digital film color correction signals, wherein the received digital film color signal is selectively modified to represent a color film exposure level.

2. A film color corrector as recited in claim 1, wherein the received digital film color signal is substantially logarithmic.

3. A digital color corrector for transforming a film color signal representing a portion of a colored optical film image into a video color signal in accordance with film and video color correction parameters associated with film and video signal characteristics, respectively, the color corrector comprising:
    film color corrector means for receiving a plurality of digital film color correction signals, for receiving a digital film color signal, and for selectively correcting the received digital film color signal in accordance with the received digital film color correction signals, wherein the received digital film color correction signals represent a plurality of color film characteristics including film color masking, the received digital film color signal represents a color film dye density, and the received digital film color signal is selectively modified to represent a color film exposure level; and
    video color corrector means for receiving a plurality of digital video color correction signals, for receiving the corrected film color signal from the film color corrector, and for selectively correcting the received corrected film color signal in accordance with the received digital video color correction signals, wherein the received digital video color correction signals represent a plurality of color video signal characteristics and the amplitude of the received corrected film color signal is selectively modified.

4. A color corrector as recited in claim 3, wherein the received digital film color signal is substantially logarithmic.

5. A color corrector as recited in claim 3, wherein the video signal characteristics represented by the received digital video color correction signal comprise hue and saturation.

6. A color corrector as recited in claim 3, wherein the video color corrector means comprises a video standard converter for selectively converting the received corrected film color signal into a video standard color signal.

7. A digital color corrector for correcting a color signal representing a portion of a colored optical image in accordance with a plurality of color correction parameters, the color corrector comprising:
    a color signal port for receiving a digital color signal representing a portion of a colored optical image;
    a parameter signal port for receiving a plurality of digital color correction signals representing a plurality of predetermined color signal characteristics; and
    encoder means for selectively encoding the received digital color signal in accordance with the received digital color correction signals, wherein the received digital color correction signals are inserted as separate signal data into the received digital color signal.

8. A color corrector as recited in Claim 7, wherein the received digital color correction signals represent a plurality of color film characteristics, the received digital color signal represents a color film dye density, and the encoded color signal represents a color film exposure level.

9. A color corrector as recited in claim 8, wherein the received digital color signal is substantially logarithmic.

10. A color corrector as recited in claim 7, wherein the received digital color correction signals represent a plurality of video signal characteristics and the received digital color signal represents a film exposure level.

11. A color corrector as received in claim 10, wherein the video signal characteristics represented by the received digital color correction signals comprise hue and saturation.

12. A method for correcting a film color signal representing a portion of a colored optical film image in accordance with a plurality of color correction parameters associated with color film characteristics, the correction method comprising the steps of:
    receiving a plurality of digital film color correction signals representing a plurality of color film characteristics including film color masking;
    receiving a digital film color signal representing a film dye density; and
    selectively correcting the received digital film color signal in accordance with the received digital film color correction signals, wherein the received digital film color signal is selectively modified to represent a color film exposure level.

13. A method for transforming a film color signal representing a portion of a colored optical film image into a video color signal in accordance with film and video color correction parameters associated with color film and video signal characteristics, respectively, the transformation method comprising the steps of:

receiving a plurality of digital film color correction signals representing a plurality of color film characteristics including film color masking;

receiving a digital film color signal representing a color film dye density;

selectively correcting the received digital film color signal in accordance with the received digital film color correction signals, wherein the received digital film color signal is selectively modified to represent a color film exposure level;

receiving a plurality of digital video color correction signals representing a plurality of video signal characteristics;

receiving the corrected film color signal; and selectively correcting the received corrected film color signal in accordance with the received digital video color correction signals, wherein the amplitude of the received corrected film color signal is selectively modified.

14. A transformation method as recited in claim 13, wherein the step of receiving a plurality of digital video color correction signals comprises receiving a plurality of digital signals representing hue and saturation.

15. A transformation method as recited in claim 13, wherein the step of selectively correcting the received corrected film color signal in accordance with the received digital video color correction signals comprises selectively converting the received corrected film color signal into a video standard color signal.

16. A method for correcting a color signal representing a portion of a colored optical image in accordance with a plurality of color correction parameters, the correction method comprising the steps of:

receiving a digital color signal representing a portion of a colored optical image;

receiving a plurality of digital color correction signals representing a plurality of predetermined color signal characteristics; and selectively encoding the received digital color signal in accordance with the received digital color correction signals, wherein the received digital color correction signals are inserted as separate signal data within the received digital color signal.

17. A correction method as recited in Claim 16, wherein the steps of receiving a plurality of digital color correction signals and receiving a digital color signal comprise receiving a plurality of digital signals representing a plurality of color film characteristics and receiving a digital signal representing a color film dye density, respectively, and further wherein the encoded color signal represents a color film exposure level.

18. A correction method as recited in Claim 16, wherein the steps of receiving a plurality of digital color correction signals and receiving a digital color signal comprise receiving a plurality of digital signals representing a plurality of video signal characteristics and receiving a digital signal representing a color film exposure level, respectively.

19. A correction method as recited in claim 18, wherein the step of receiving a plurality of digital color correction signals comprises receiving a plurality of digital signals representing hue and saturation.

20. A correction method as recited in claim 18, wherein the step of selectively encoding the received digital color signal in accordance with the received digital color correction signals comprises selectively generating video color standard data from the received digital color signal and selectively inserting the generated video color standard data into the received digital color signal.

21. A digital film color corrector for correcting a film color signal representing a portion of a colored optical film image in accordance with a plurality of color correction parameters associated with color film characteristics, the color corrector comprising;

a color signal port for receiving a digital film color signal representing a color film dye density;

a parameter signal port for receiving a plurality of digital film color correction signals representing a plurality of color film characteristics including film speed, gamma, and minimum and maximum film dye density; and film color corrector means for selectively correcting the received digital film color signal in accordance with the received digital film color correction signals, wherein the received digital film color signal is selectively modified to represent a color film exposure level.

22. A digital film color corrector for correcting a film color signal representing a portion of a colored optical film image in accordance with a plurality of color correction parameters associated with color film characteristics, the color corrector comprising:

a color signal port for receiving a digital film color signal representing a color film dye density;

a parameter signal port for receiving a plurality of digital film color correction signals representing a plurality of color film characteristics; and film color corrector means for selectively correcting the received digital film color signal in accordance with the received digital film color correction signals, wherein the received digital film color signal is selectively modified to represent a color film exposure level;

wherein the film color corrector means comprises a sensitometric converter for selectively converting the received digital film color signal into the corrected film color signal substantially in accordance with a Hurter-Driffield characteristic curve.

23. A digital film color corrector for correcting a film color signal representing a portion of a colored optical film image in accordance with a plurality of color correction parameters associated with color film characteristics, the color corrector comprising:

a color signal port for receiving a digital film color signal representing a color film dye density;

a parameter signal port for receiving a plurality of digital film color correction signals representing a plurality of color film characteristics; and film color corrector means for selectively correcting the received digital film color signal in accordance with the received digital film color correction signals, wherein the received digital film color signal is selectively modified to represent a color film exposure level;

wherein the film color corrector comprises a sensitometric converter for selectively converting the received digital film color signal into the corrected film color signal substantially in accordance with the following formula:

$$E = E_0[(10^{A(D-D_1)} - 1/(1 - 10^{B(D=D_u)})]^N$$

where:

E = exposure level of color film dye (represented by the corrected film color signal)

$E_O$ = antilog$_{10}$\{0.8/ASA − Nx [0.1 + log$_{10}$(1 − 10$^{-0.1}$)]\}

A = measure of asymmetry of toe ("toe characters") of color film dye's characteristic curve = |Dd = Dl| [default value: A = −1]· ≈ log$_{10}$(1 − 10$^{(Dd-Dl)}$)/(Dd − Dl)

Dd = toe density of color film dye

Dl = minimum (base+fog) density of color film dye

D = density of color film dye (represented by the received digital film color signal)

B = measure of asymmetry of shoulder ("shoulder character") of color film dye's characteristic curve = |Du − Dc| [default value: B = 1] ≈ log$_{10}$(1 − 10$^{(Dc-Du)}$)/(Dc − Du)

Du = maximum (saturation) density of color film dye

Dc = shoulder density of color film dye N ≈ 1/γ

ASA = film speed

24. A digital color corrector for transforming a film color signal representing a portion of a colored optical film image into a video color signal in accordance with film and video color correction parameters associated with film and video signal characteristics, respectively, the color corrector comprising:

film color corrector means for receiving a plurality of digital film color correction signals, for receiving a digital film color signal, and for selectively correcting the received digital film color signal in accordance with the received digital film color correction signals, wherein the received digital film color correction signals represent a plurality of color film characteristics including film speed, gamma, and minimum and maximum film dye density, the received digital film color signal represents a color film dye density, and the received digital film color signal is selectively modified to represent a color film exposure level; and video color corrector means for receiving a plurality of digital video color correction signals, for receiving the corrected film color signal from the film color corrector, and for selectively correcting the received corrected film color signal in accordance with the received digital video color correction signals, wherein the received digital video color correction signals represent a plurality of color video signal characteristics and the amplitude of the received corrected film color signal is selectively modified.

25. A digital color corrector for transforming a film color signal representing a portion of a colored optical film image into a video color signal in accordance with film and video color correction parameters associated with film and video signal characteristics, respectively, the color corrector comprising:

film color corrector means for receiving a plurality of digital film color correction signals, for receiving a digital film color signal, and for selectively correcting the received digital film color signal in accordance with the received digital film color correction signals, wherein the received digital film color corrections signals represent a plurality of color film characteristics, the received digital film color signal represents a color film dye density, and the received digital film color signal is selectively modified to represent a color film exposure level; and video color corrector means for receiving a plurality of digital video color correction signals, for receiving the corrected film color signal from the film color corrector, and for selectively correcting the received corrected film color signal in accordance with the received digital video color correction signals, wherein the received digital video color correction signals represent a plurality of color video signal characteristics and the amplitude of the received corrected film color signal is selectively modified;

wherein the film color corrector means comprises a sensitometric converter for selectively converting the received digital film color signal into the corrected film color signal substantially in accordance with a Hurter-Driffield characteristic curve.

26. A digital color corrector for transforming a film color signal representing a portion of a colored optical film image into a video color signal in accordance with film and video color correction parameters associated with film and video signal characteristics, respectively, the color corrector comprising:

film color corrector means for receiving a plurality of digital film color correction signals, for receiving a digital film color signal, and for selectively correcting the received digital film color signal in accordance with the received digital film color correction signals, wherein the received digital film color correction signals represent a plurality of color film characteristics, the received digital film color signal represents a color film dye density, and the received digital film color signal is selectively modified to represent a color film exposure level; and video color corrector means for receiving a plurality of digital video color correction signals, for receiving the corrected film color signal from the film color corrector, and for selectively correcting the received corrected film color signal in accordance with the received digital video color correction signals, wherein the received digital video color correction signals represent a plurality of color video signal characteristics and the amplitude of the received corrected film color signal is selectively modified;

wherein the film color correct means comprises a sensitometric converter for selectively converting the received digital film color signal into the corrected film color signal substantially in accordance with the following formula:

$$E = E_O[(10^{A(D-Dl)} - 1/(1 - 10^{B(D-Du)})]^N$$

where:

E = exposure level of color film dye (represented by the corrected film color signal)

$E_O$ = antilog$_{10}$\{0.8/ASA − NX [0.1 + log$_{10}$(1 − 10$^{-0.1}$)]\}

A = measure of asymmetry of toe ("toe character") of color film dye's characteristic curve = |Dd − Dl| [default value: A = −1]· ≈ log$_{10}$(1 − 10$^{(Dd-Dl)}$)/(Dd − Dl)

Dd = toe density of color film dye

Dl = minimum (base+fog) density of color film dye

D = density of color film dye (represented by the received digital film color signal)

B = measure of asymmetry of shoulder ("shoulder character") of color film dye's characteristic curve $= |Du-Dc|$ [default value: B=1] $\approx \log_{10}(1-10^{(dc-Du)})/(Dc-Du)$ Du=maximum (saturation) density of color film dye Dc=shoulder density of color film dye $N \approx 1/\gamma$ ASA=film speed 27. A digital color corrector for transforming a film color signal representing a portion of a colored optical film image into a video color signal in accordance with film and video color correction parameters associated with film and video signal characteristics, respectively, the color corrector comprising:

film color corrector means for receiving a plurality of digital film color correction signals, for receiving a digital film color signal, and for selectively correcting the received digital film color signal in accordance with the received digital film color correction signals, wherein the received digital film color correction signals represent a plurality of color film characteristics, the received digital film color signal represents a color film dye density, and the received digital film color signal is selectively modified to represent a color film exposure level; and video color corrector means for receiving a plurality of digital video color correction signals, for receiving the corrected film color signal from the film color corrector, and for selectively correcting the received corrected film color signal in accordance with the received digital video color correction signals, wherein the received digital video color correction signals represent a plurality of color video signal characteristics and the amplitude of the received corrected film color signal is selectively modified;

wherein the video color corrector means comprises a video standard converter for selectively converting the received corrected film color signal into a video standard color signal, and further wherein the received corrected film color signal is selectively converted into a video standard color signal substantially in accordance with the following formula:

$$V_C = 1.1115 L_C^{0.045} - 0.115, \text{ for } L_C \geq 0.0228$$
$$= 4L_C, \text{ for } L_C < 0.0228$$

where:

$V_C$=reference SMPTE 240 M video camera output voltage for colored video signal (represented by the video standard color signal)

$L_C$=incident colored light producing $V_C$ (represented by the received corrected film color signal)

28. A digital color corrector for correcting a color signal representing a portion of a colored optical image in accordance with a plurality of color correction parameters, the color corrector comprising:

a color signal port for receiving a digital color signal representing a color film dye density;

a parameter signal port for receiving a plurality of digital color correction signals representing a plurality of color film characteristics including film speed, gamma, and minimum and maximum film dye density; and encoder means for selectively encoding the received digital color signal in accordance with the received digital color correction signals, wherein the received digital color correction signals are inserted as separate signal data into the received digital color signal, and wherein the encoded color signal represents a color film exposure level.

29. A digital color corrector for correcting a color signal representing a portion of a colored optical image in accordance with a plurality of color correction parameters, the color corrector comprising;

a color signal port for receiving a digital color signal representing a color film dye density;

a parameter signal port for receiving a plurality of digital color correction signals representing a plurality of color film characteristics; and encoder means for selectively encoding the received digital color signal in accordance with the received digital color correction signals, wherein the received digital color correction signals are inserted as separate signal data into the received digital color signal, and wherein the encoded color signal represents a color film exposure level;

wherein he encoder means comprises a sensitometric encoder coupled to selectively generate film color correction data from the received digital color correction signals and further coupled to selectively insert the generated film color correction data into the received digital color signal, and wherein the film color correction data is generated substantially in accordance with a Hurter-Driffield characteristic curve.

30. A digital color corrector for correcting a color signal representing a portion of a colored optical image in accordance with a plurality of color correction parameters, the color corrector comprising:

a color signal port for receiving a digital color signal representing a color film dye density;

a parameter signal port for receiving a plurality of digital color correction signals representing a plurality of color film characteristics; and encoder means for selectively encoding the received digital color signal in accordance with the received digital color correction signals, wherein the received digital color correction signals are inserted as separate signal data into the received digital color signals, and wherein the encoded color signal represents a color film exposure level;

wherein the encoder means comprises a sensitometric encoder coupled to selectively generate film color correction data from the received digital color corrections signals and further coupled to selectively insert the generated film color correction data into the received digital color signal, and wherein the film color correction data is generated substantially in accordance with the following formula:

$$E = E_O[(10^{A(D-Dl)}-1)/(1-10^{B(D-Du)})]^N$$

where:

E=exposure level of color film dye (represented by the corrected film color signal)

$E_O$=antilog$_{10}${0.8/ASA$-$Nx [0.1+$\log_{10}$(1$-$10$^{-0.1}$)]}

A=measure of asymmetry of toe ("toe character") of color film dye's characteristic curve $= |Dd-Dl|$ [default value: $A=-1$]- $\approx \log_{10}(1-10^{(Dd-Dl)})/(Dd-Dl)$ Dd=toe density of color film dye Dl = minimum (base+fog) density of color film dye D = density of color film dye (represented by the received digital film color signal)

B = measure of symmetry of shoulder ("shoulder character") of color film dye's characteristic curve = |Du−Dc| [default value: B=1] ≈ log$_{10}$(1−10$^{(Dc-Du)}$)/(Dc−Du)

Du = maximum (saturating) density of color film dye

Dc = shoulder density of color film dye N ≈ 1/γ

ASA = film speed

31. A digital color corrector for correcting a color signal representing a portion of a colored optical image in accordance with a plurality of color correction parameters, the color corrector comprising:

a color signal port for receiving a digital color signal representing a film exposure level;

a parameter signal port for receiving a plurality of digital color correction signals representing a plurality of video signal characteristics; and encoder means for selectively encoding the received digital color signal in accordance with the received digital color correction signals, wherein the received digital color correction signals are inserted as separate signal data into the received digital color signal;

wherein the encoder means comprises a video color standard encoder coupled to selectively generate video color standard data from the received digital color signal and further coupled to selectively insert the generated video color standard data into the received digital color signal.

32. A color corrector as recited in claim 54, wherein the video color standard data is generated substantially in accordance with the following formula:

$$V_C = 1.1115 L_C^{0.045} - 0.115, \text{ for } L_C \geq 0.0228$$
$$= 4 L_C, \text{ for } L_C < 0.0228$$

where:

$V_C$ = reference SMPTE 240 M video camera output voltage for colored video signal (represented by the video color standard data)

$L_C$ = incident colored light producing $V_C$ (represented by the received digital color signal)

33. A method for correcting a film color signal representing a portion of a colored optical film image in accordance with a plurality of color correction parameters associated with color film characteristics, the correction method comprising the steps of:

receiving a plurality of digital film color correction signals representing a plurality of color film characteristics including film speed, gamma, and minimum and maximum film dye density;

receiving a digital film color signal representing a film dye density; and selectively correcting the received digital film color signal in accordance with the received digital film color correction signals, wherein the received digital film color signal is selectively modified to represent a color film exposure level.

34. A method for correcting a film color signal representing a portion of a colored optical film image in accordance with a plurality of color correction parameters associated with color film characteristics, the correction method comprising the steps of:

receiving a plurality of digital film color correction signals representing a plurality of color film characteristics;

receiving a digital film color signal representing a film dye density; and selectively correcting the received digital film color signal in accordance with the received digital film color correction signals, wherein the received digital film color signal is selectively modified to represent a color film exposure level, by selectively sensitometrically converting the corrected film color signal substantially in accordance with a Hurter-Driffield characteristic curve.

35. A method for correcting a film color signal representing a portion of a colored optical film image in accordance with a plurality of color correction parameters associated with color film characteristics, the correction method comprising the steps of:

receiving a plurality of digital film color correction signals representing a plurality of color film characteristics;

receiving a digital film color signal representing a film dye density; and selectively correcting the received digital film color signal in accordance with the received digital film color correction signals, wherein the received digital film color signal is selectively modified to represent a color film exposure level, by selectively sensitometrically converting the received digital film color signal into the corrected film color signal substantially in accordance with the following formula:

$$E = E_O [ (10^{A(D-Dl)} - 1) / (1 - 10^{B(D-Du)}) ]^N$$

where:

E = exposure level of color film dye (represented by the corrected film color signal)

$E_O$ = antilog$_{10}${0.8/ASA−Nx [0.1+log$_{10}$(1−10$^{-0.1}$)]}

A = measure of asymmetry of toe ("toe character") of color film dye's characteristic curve = |Dd−Dl| [default value: A=−1]- ≈ log$_{10}$(1−10$^{(Dd-Dl)}$) /(Dd−Dl)

Dd = toe density of color film dye

Dl = minimum (base+fog) density of color film dye

D = density of color film dye (represented by the received digital film color signal)

B = measure of asymmetry of shoulder ("shoulder character") of color film dye's characteristic curve = |Du−Dc| [default value: B=1] ≈ log$_{10}$(1−10$^{(DC-Du)}$)/(Dc−Du)

Du = maximum (saturation) density of color film dye

Dc = shoulder density of color film dye N ≈ 1/γ

ASA = film speed

36. A method for transforming a film color signal representing a portion of a colored optical film image into a video color signal in accordance with film and video color correction parameters associated with color film and video signal characteristics, respectively, the transformation method comprising the steps of:

receiving a plurality of digital film color correction signals representing a plurality of color film characteristic including film speed, gamma, and minimum and maximum film dye density;

receiving a digital film color signal representing a color film dye density;

selectively correcting the received digital film color signal in accordance with the received digital film color correction signals, wherein the received digital film color signal is selectively modified to represent a color film exposure level;

receiving a plurality of digital video color correction signals representing a plurality of video signal characteristics;

receiving the corrected film color signal; and selectively correcting the received corrected film color signal in accordance with the received digital video color correction signals, wherein the amplitude of the received corrected film color signal is selectively modified.

37. A method for transforming a film color signal representing a portion of a colored optical film image into a video color signal in accordance with film and video color correction parameters associated with color film and video signal characteristics, respectively, the transformation method comprising the steps of:

receiving a plurality of digital film color correction signals representing a plurality of color film characteristics;

receiving a digital film color signal representing a color film dye density;

selectively correcting the received digital film color signal in accordance with the received digital film color correction signals, wherein the received digital film color signal is selectively modified to represent a color film exposure level, by selectively converting the received digital film color signal into the corrected film color signal substantially in accordance with a Hurter-Driffield characteristic curve;

receiving a plurality of digital video color correction signals representing a plurality of video signal characteristics;

receiving the corrected film color signal; and selectively correcting the received corrected film color signal in accordance with the received digital video color correction signals, wherein the amplitude of the received corrected film color signal is selectively modified.

38. A method for transforming a film color signal representing a portion of a colored optical film image into a video color signal in accordance with film and video color correction parameters associated with color film and video signal characteristics, respectively, the transformation method comprising the steps of:

receiving a plurality of digital film color correction signals representing a plurality of color film characteristics;

receiving a digital film color signal representing a color film dye density;

selectively correcting the received digital film color signal in accordance with the received digital film color corrections signals, wherein the received digital film color signal is selectively modified to represent a color film exposure level, by selectively converting the received digital film color signal into the corrected film color signal substantially in accordance with the following formula:

$$E = E_O[(10^{A(D-Dl)} - 1)/(1 - 10^{B(D-Du)})]^N$$

where:

$E$ = exposure level of color film dye (represented by the corrected film color signal)

$E_O$ = antilog$_{10}${0.8/ASA − Nx [0.1 + log$_{10}$(1 − 10$^{-0.1}$)[}

$A$ = measure of asymmetry of toe ("toe character") of color film dye's characteristic curve = |Dd − Dl| [default value: A = −1] ≈ log$_{10}$(1 − 10$^{(Dd-Dl)}$)/(Dd − Dl)

$Dd$ = toe density of color film dye $Dl$ = minimum (base+fog) density of color film dye $D$ = density of color film dye (represented by the received digital film color signal)

$B$ = measure of asymmetry of shoulder ("shoulder character") of color film dye's characteristic curve = |Du − Dc| [default value: B = 1] ≈ log$_{10}$(1 − 10$^{(Dc-Du)}$)/(Dc − Du)

$Du$ = maximum (saturation) density of color film dye $Dc$ = shoulder density of color film dye $N \approx 1/\gamma$ ASA = film speed;

receiving a plurality of digital video color correction signals representing a plurality of video signal characteristics;

receiving the corrected film color signal; and selectively correcting the received corrected film color signal in accordance with the received digital video color correction signals, wherein the amplitude of the received corrected film color signal is selectively modified.

39. A method for transforming a film color signal representing a portion of a colored optical film image into a video color signal in accordance with film and video color correction parameters associated with color film and video signal characteristics, respectively, the transformation method comprising the steps of:

receiving a plurality of digital film color correction signals representing a plurality of color film characteristics;

receiving a digital film color signal representing a color film dye density;

selectively correcting the received digital film color signal in accordance with the received digital film color correction signals, wherein the received digital film color signal is selectively modified to represent a color film exposure level;

receiving a plurality of digital video color correction signals representing a plurality of video signal characteristics;

receiving the corrected film color signal; and selectively correcting the received corrected film color signal in accordance with the received digital video color correction signals, wherein the amplitude of the received corrected film color signal is selectively modified, by selectively converting the received corrected film color signal into a video standard color signal substantially in accordance with the following formula:

$$V_C = 1.1115 L_C^{0.045} - 0.115, \text{ for } L_C \geq 0.0228$$
$$= 4L_C, \text{ for } L_C < 0.0228$$

where:

$V_c$ = reference SMPTE 240 M video camera output voltage for colored video signal (represented by the video standard color signal)

40. A method for correcting a color signal representing a portion of a colored optical image in accordance with a plurality of color correction parameters, the correction method comprising the steps of:
  receiving a digital color signal representing a color film dye density;
  receiving a plurality of digital color correction signals representing a plurality of color film characteristics including film speed gamma, and minimum and maximum film dye density; and
  selectively encoding the received digital color signal in accordance with the received digital color correction signals, wherein the received digital color corrections signals are inserted as separated signal data within the received digital color signal and the encoded color signal represents a color film exposure level.

41. A method for correcting a color signal representing a portion of a colored optical image in accordance with a plurality of color correction parameters, the correction method comprising the steps of:
  receiving a digital color signal representing a color film dye density;
  receiving a plurality of digital color correction signals representing a plurality of color film characteristics; and
  selectively encoding the received digital color signal in accordance with the received digital color correction signals by selectively generating film color correction data from the received digital color correction signals and selectively inserting the generated film color correction data into the received digital color signal, wherein the film color correction data is generated substantially in accordance with a Hurter-Driffield characteristic curve and the encoded color signal represents a color film exposure level.

42. A method for correcting a color signal representing a portion of a colored optical image in accordance with a plurality of color correction parameters, the correction method comprising the steps of:
  receiving a digital color signal representing a color film dye density;
  receiving a plurality of digital color correction signals representing a plurality of color film characteristics; and
  selectively encoding the received digital color signal in accordance with the received digital color correction signals, wherein the received digital color correction signals are inserted as separate signal data within the received digital color signal, by selectively generating film color correction data from the received digital color correction signals and selectively inserting the generated film color correction data into the received digital color signal, wherein the encoded color signal represents a color film exposure level and the film color correction data is generated substantially in accordance with the following formula:

$$E = E_O[(10^{A(D-Dl)} - 1)/(1 - 10^{B(D-Du)})]^N$$

where:
  $E$ = exposure level of color film dye (represented by the corrected film color signal)
  $E_O = \text{antilog}_{10}\{0.8/\text{ASA} - Nx]0.1 + \log_{10}(1 - 10^{-0.1})]\}$
  $A$ = measure of asymmetry of toe ("toe character") of color film dye's characteristic curve $= |Dd - Dl|$ [default value: $A = -1$]$\approx \log_{10}(1 - 10^{(Dd-Dl)})/(Dd - Dl)$
  $Dd$ = toe density of color film dye
  $Dl$ = minimum (base+fog) density of color film dye
  $D$ = density of color film dye (represented by the received digital film color signal)
  $B$ = measure of asymmetry of shoulder ("shoulder character") of color film dye's characteristic curve $= |Du - Dc|$ [default value: $B = 1$]$\approx \log_{10}(1 - 10^{(Dc-Du)})/(Dc - Du)$
  $Du$ = maximum (saturation) density of color film dye
  $Dc$ = shoulder density of color film dye $N \approx 1/\gamma$
  ASA = film speed.

43. A method for correcting a color signal representing a portion of a colored optical image in accordance with a plurality of color correction parameters, the correction method comprising the steps of:
  receiving a digital color signal representing a color film exposure level;
  receiving a plurality of digital color correction signals representing a plurality of video signal characteristics; and
  selectively encoding the received digital color signal in accordance with the received digital color correction signals by selectively generating video color standard data from the received digital color signal and selectively inserting the generated video color standard data into the received digital color signal, wherein the video color standard data is selectively generated from the received digital color signal substantially in accordance with the following formula:

$$V_C = 1.1115 L_C^{0.045} - 0.115, \text{ for } L_C \geq 0.0228$$
$$= 4L_C, \text{ for } L_C < 0.0228$$

where:
  $V_C$ = reference SMPTE 240 M video camera output voltage for colored video signal (represented by the video color standard data)
  $L_C$ = incident colored light producing $V_C$ (represented by the received digital color signal).

* * * * *